(12) United States Patent
Oyama et al.

(10) Patent No.: US 10,567,077 B2
(45) Date of Patent: Feb. 18, 2020

(54) IMBALANCE COMPENSATION DEVICE, TRANSMISSION DEVICE, AND IMBALANCE COMPENSATION METHOD

(71) Applicant: FUJITSU LIMITED, Kawasaki, Kanagawa (JP)

(72) Inventors: Tomofumi Oyama, Kawasaki (JP); Takeshi Hoshida, Kawasaki (JP); Yoshitaka Nomura, Shinagawa (JP); Hisao Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/913,208

(22) Filed: Mar. 6, 2018

(65) Prior Publication Data
US 2018/0287699 A1    Oct. 4, 2018

(30) Foreign Application Priority Data
Mar. 30, 2017 (JP) ................................. 2017-069235

(51) Int. Cl.
*H04B 10/079* (2013.01)
*H04B 10/67* (2013.01)

(52) U.S. Cl.
CPC ..... *H04B 10/07955* (2013.01); *H04B 10/677* (2013.01)

(58) Field of Classification Search
CPC ........... H04B 10/07955; H04B 10/077; H04B 10/00; H04B 10/6165; H04B 10/677; H04J 14/0221; H04J 14/0227
See application file for complete search history.

(56) References Cited

U.S. PATENT DOCUMENTS

| | | | | |
|---|---|---|---|---|
| 2007/0298733 A1* | 12/2007 | Cole | .................... | H04B 17/101 455/114.2 |
| 2008/0144736 A1* | 6/2008 | Assouline | ............. | H04L 27/364 375/298 |
| 2012/0270516 A1 | 10/2012 | Kang et al. | | |

FOREIGN PATENT DOCUMENTS

| | | |
|---|---|---|
| JP | 2009-147498 | 7/2009 |
| JP | 2012-85302 | 4/2012 |

* cited by examiner

*Primary Examiner* — Ted M Wang
(74) *Attorney, Agent, or Firm* — Staas & Halsey LLP

(57) ABSTRACT

Provided is an imbalance compensation device that compensates for an imbalance between an in-phase component and a quadrature-phase component of a signal, the imbalance compensation device including: an extracting unit that extracts a signal component in an upper sideband or a signal component in a lower sideband from the signal; a measuring unit that measures power of the signal component in the upper sideband or the signal component in the lower sideband extracted by the extracting unit; and an adjusting unit that adjusts a parameter related to the imbalance, in accordance with the power measured by the measuring unit.

6 Claims, 16 Drawing Sheets the following detailed description are exemplary and explanatory and are not restrictive of the invention, as claimed.

IMBALANCE COMPENSATION DEVICE, TRANSMISSION DEVICE, AND IMBALANCE COMPENSATION METHOD

CROSS-REFERENCE TO RELATED APPLICATION

This application is based upon and claims the benefit of priority of the prior Japanese Patent Application No. 2017-069235 filed on Mar. 30, 2017, the entire contents of which are incorporated herein by reference.

FIELD

A certain aspect of the embodiments described herein relates to an imbalance compensation device, a transmission device, a reception device, and an imbalance compensation method.

BACKGROUND

In response to an increasing demand for large-volume data transmission, digital coherent optical transmission systems have been studied and developed to enable transmission at 100 Gbps or faster with single wavelength light, for example. Unlike an intensity modulation system, a digital coherent optical transmission system uses not only optical intensities but also optical phases in signal modulation. An example of such a modulation method is quadrature amplitude modulation (QAM). By QAM, the amplitudes of respective signals of an in-phase component and a quadrature-phase component are adjusted.

In a modulation system of this type, a skew, a power difference, and a quadrature deviation (phase rotation) are generated between a signal of an in-phase component and a signal of a quadrature-phase component in each transmitter and each receiver. This phenomenon is called IQ imbalance (also IQ unbalance, IQ incompleteness, or the like), and causes signal deterioration. To counter this, Japanese Patent Application Publication Nos. 2009-147498 and 2012-85302 (hereinafter, referred to as Patent Documents 1 and 2, respectively), for example, disclose IQ imbalance compensation means.

SUMMARY

According to an aspect of the embodiments, there is provided an imbalance compensation device that compensates for an imbalance between an in-phase component and a quadrature-phase component of a signal, the imbalance compensation device including: an extracting unit that extracts a signal component in an upper sideband or a signal component in a lower sideband from the signal; a measuring unit that measures power of the signal component in the upper sideband or the signal component in the lower sideband extracted by the extracting unit; and an adjusting unit that adjusts a parameter related to the imbalance, in accordance with the power measured by the measuring unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

However, the technique disclosed in Patent Document 1 requires a complicated process for estimating an IQ imbalance from the locations of a reference signal and null symbols. The technique disclosed in Patent Document 2 requires a calculation process based on complicated mathematical formulas.

Figure 1:
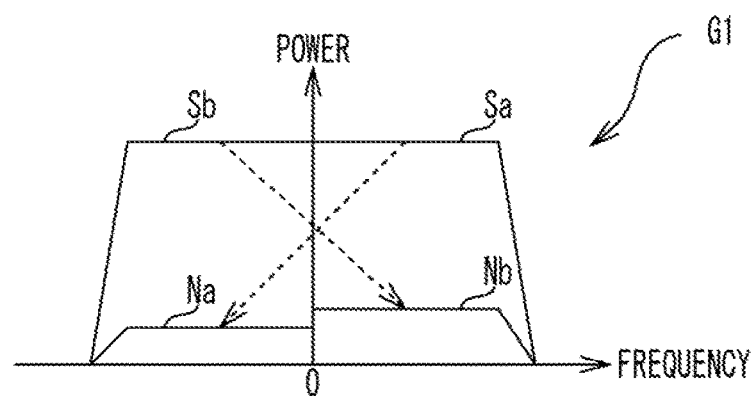
FIG. 1 shows graphs indicating example spectrums of signals.
Figure 1:
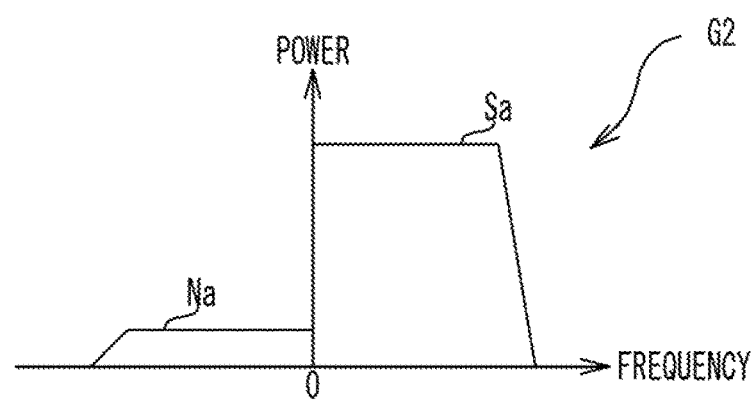
Figure 1:
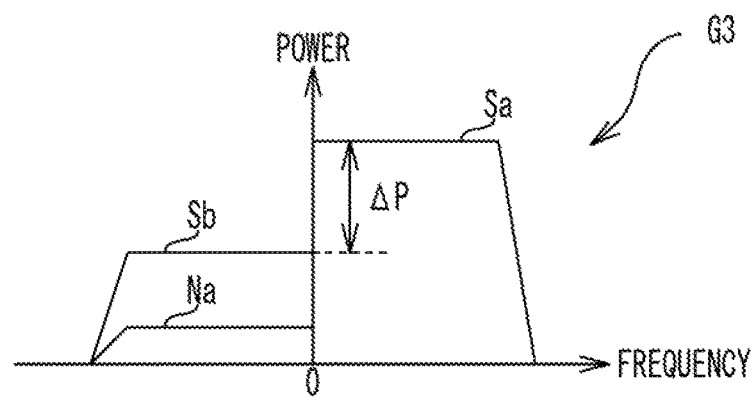
Figure 1:
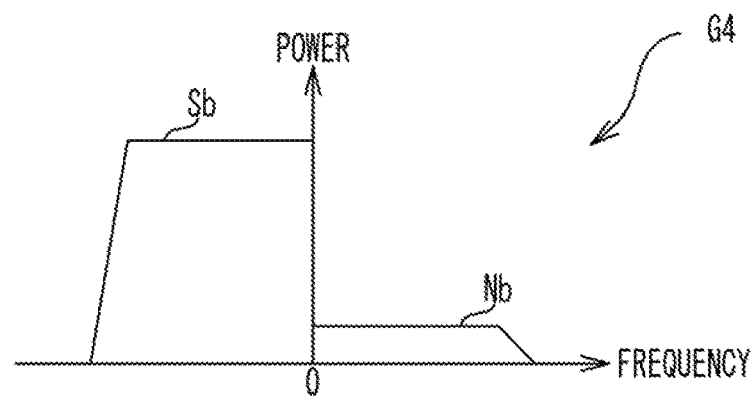

FIG. 1 shows graphs of example signal spectrums. Reference sign G1 indicates crosstalk components Na and Nb generated in the upper sideband (USB) Sa and the lower sideband (LSB) Sb of a signal spectrum due to an IQ imbalance.

$$S_\alpha(\omega) = \cos(\omega\tau/2)S(\omega) + \sin(\omega\tau/2)S^*(-\omega) \quad (1)$$

Where the spectrum of an ideal signal that does not have any skew between an in-phase component and a quadrature-phase component is represented by $S(\omega)$, the spectrum $S_\alpha(\omega)$ having a skew $\tau$ existing therein is expressed by the above equation (1). In the equation (1), the variable $\omega$ is the angular velocity ($=2\pi \times$ frequency).

$$S_\beta(\omega) = K_1 S(\omega) + K_2 S^*(-\omega) \quad (2)$$

Meanwhile, the spectrum $S_\beta(\omega)$ of a signal having a power difference and quadrature deviation existing between an in-phase component and a quadrature-phase component is expressed by the above equation (2) in the same manner as the equation (1). In the equation (2), the variables K1 and K2 are complex coefficients determined by the power difference and the quadrature deviation.

As can be seen from the equation (1) and the equation (2), the IQ imbalance expressed on a frequency axis is the crosstalk components Na and Nb, each of which is generated in one of the upper sideband Sa and the lower sideband Sb of a signal by the other one of the upper sideband Sa and the lower sideband Sb. More specifically, as indicated by dashed lines, the upper sideband Sa interferes with the lower sideband Sb, to generate the crosstalk component Na. The lower sideband Sb interferes with the upper sideband Sa, to generate the crosstalk component Nb.

Therefore, as indicated by reference sign G2, in a case where a single sideband signal having its signal band in the upper sideband Sa is transmitted/received, the crosstalk component Na is added to the lower sideband Sb of the signal. As a result, it becomes possible to detect the magnitude of the IQ imbalance (or the degree of the IQ imbalance) by measuring the power of the crosstalk component Na.

Further, as indicated by reference sign G3, the magnitude of an IQ imbalance can be detected by transmitting/receiving a signal having a difference in mean power value between the signal component in the upper sideband Sa and the signal component in the lower sideband Sb, instead of a single sideband signal. More specifically, the power of the signal component in the upper sideband Sa is greater than the mean power value of the signal component in the lower sideband Sb by ΔP, and accordingly, the magnitude of the IQ imbalance can be detected from the power of the signal component in the lower sideband Sb having the crosstalk component Na added thereto.

Also, as indicated by reference sign G4, in a case where a single sideband signal having its signal band in the lower sideband Sb is transmitted/received, the crosstalk component Nb is added to the upper sideband Sa of the signal. Because of this, the magnitude of an IQ imbalance can be detected by measuring the power of the crosstalk component Nb in the upper sideband Sa. Further, in a case where a signal in which the power of the signal component in the lower sideband Sb is greater than the mean power value of the signal component in the lower sideband Sb by a predetermined value is transmitted/received, the magnitude of an IQ imbalance can be detected in the same manner as above.

As a signal having a difference in mean power value between the signal component in the upper sideband Sa and the signal component in the lower sideband Sb is transmitted/received in the above manner, the magnitude of an IQ imbalance can be detected. Further, in a case where a single sideband signal having its signal band in the upper sideband Sa or the lower sideband Sb is transmitted/received, the lower sideband Sb or the upper sideband Sa on the opposite side contains only the crosstalk component Na or Nb. Thus, the magnitude of an IQ imbalance can be detected with high precision.

Figure 2:
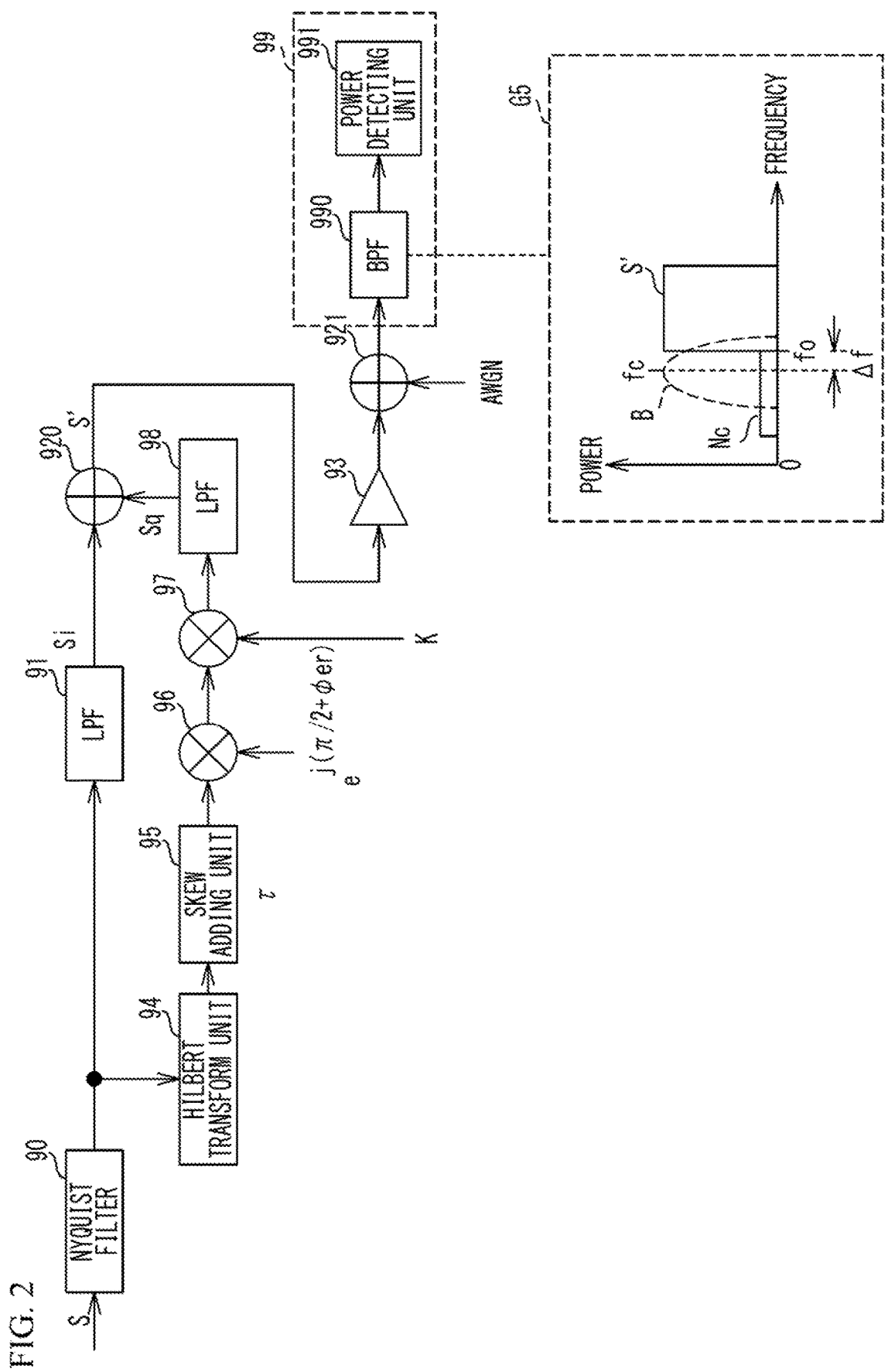
FIG. 2 is a diagram showing an example configuration to be used in an IQ imbalance numerical value simulation.

FIG. 2 is a diagram showing an example configuration to be used in IQ imbalance numerical value simulations. The configuration for numerical value simulations includes a Nyquist filter 90, low-pass filters (LPFs) 91 and 98, adders 920 and 921, an amplifier 93, a Hilbert transform unit 94, a skew adding unit 95, multipliers 96 and 97, and a monitor unit 99. The monitor unit 99 includes a bandpass filter (BPF) 990 and a power detecting unit 991.

The Nyquist filter 90, the LPF 91, the adder 920, the amplifier 93, the adder 921, the BPF 990, and the power detecting unit 991 are connected in series in this order. The Hilbert transform unit 94, the skew adding unit 95, the multipliers 96 and 97, and the LPF 98 are connected in series in this order.

As a signal S passes through the Nyquist filter 90, the waveform of the signal S is shaped. After that, the signal S is divided, and the divided signals S are input to the LPF 91 and the Hilbert transform unit 94. It should be noted that the modulation method for the signal S is "SSB ON-OFF keying", the symbol rate is 32 (Gbaud), and the roll-off rate of the Nyquist filter 90 is 0.01.

Passing through the LPF 91, one of the signals S is transformed into a signal Si having an in-phase component of SSB. The other signal S is subjected to Hilbert transform by the Hilbert transform unit 94, and turns into a signal having only an SSB component. After the Hilbert transform, a skew τ (ps) is added to the signal S by the skew adding unit 95.

A quadrature deviation (per is then added to the signal S by the multiplier 96, and a power error according to a coefficient K is further added to the signal S by the multiplier 97 in the latter stage. In this manner, an IQ imbalance can be given to the signal S by the skew adding unit 95 and the multipliers 96 and 97.

After that, the signal S passes through the LPF 98, and is transformed into a signal Sq of a quadrature-phase component of SSB. It should be noted that the LPFs 91 and 98 are Bessel functions having quartic transfer functions, for example, and each have a passband of 21 (GHz).

The signal Si of the in-phase component and the signal Sq of the quadrature-phase component are input to the adder 920, and are then combined. The combined signal S' contains only the signal component in the upper sideband, as indicated by reference sign G2 in FIG. 1.

The signal S' is amplified by the amplifier 93 so that the output power reaches a predetermined value, and additive white gaussian noise (AWGN) is then added to the signal S' by the adder 921. The additive white gaussian noise is equivalent to the optical signal-to-noise ratio (OSNR) of 50 (dB), for example.

The monitor unit 99 detects the power of the crosstalk component of the signal S'. The BPF 990 passes the signal component in the passband from the signal S'. Reference sign G5 indicates the spectrum of the signal S' and the passband B of the BPF 990. The center frequency fc of the passband B deviates from the center frequency fo of the signal S' toward the lower sideband by Δf. Because of this, the BPF 990 extracts the crosstalk component Nc of the lower sideband of the signal S', and outputs the crosstalk component Nc to the power detecting unit 991. It should be noted that the BPF 990 is a gaussian function having a quartic transfer function, and has a passband of 12.5 (GHz).

The power detecting unit 991 detects the power of the crosstalk component Nc of the signal S'. As will be described later, the magnitude of an IQ imbalance can be measured from the power of a crosstalk component N.

Figure 3:
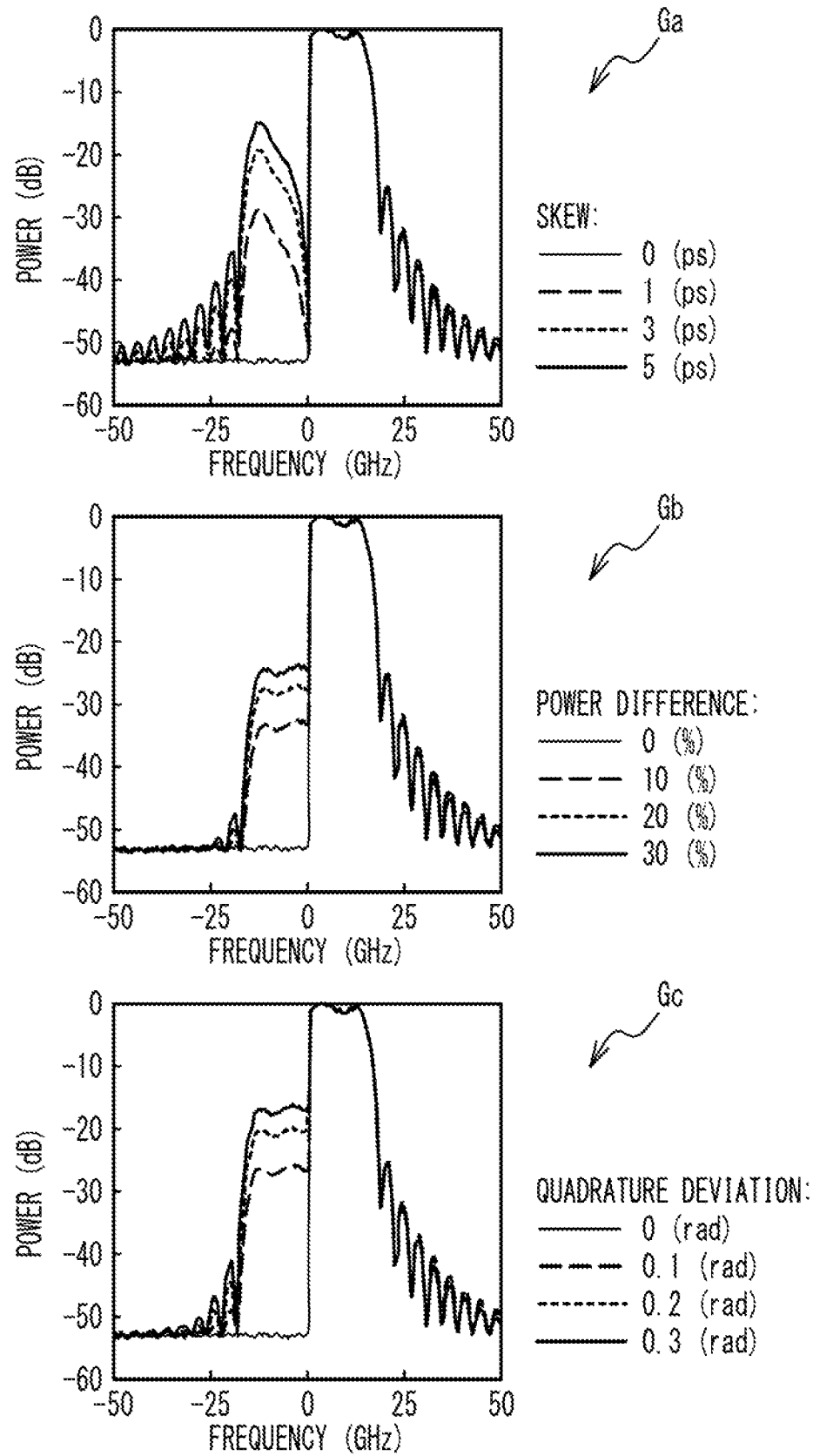
FIG. 3 shows waveform charts each indicating an example of changes in the spectrum of a signal depending on an IQ imbalance.

FIG. 3 shows waveform charts showing example changes in the spectrum of a signal S' depending on an IQ imbalance. Each waveform chart shows the waveform of a signal S' to be input to the BPF 990. In each waveform chart, the abscissa axis indicate frequency, and the ordinate axis indicates power (dB). The center frequency of each signal S' is 0 (GHz).

Reference sign Ga indicates changes in the spectrum when the skew between the in-phase component and the quadrature-phase component of the signal S' is changed from 0 (ps) to 1 (ps) to 3 (ps) to 5 (ps). As the skew increases, the power of the crosstalk component Nc of the lower sideband (−50 to 0 (GHz)) also increases.

Reference sign Gb indicates changes in the spectrum when the power difference between the in-phase component and the quadrature-phase component of the signal S' is changed from 0(%) to 10(%) to 20(%) to 30(%). As the power difference increases, the power of the crosstalk component Nc of the lower sideband also increases.

Reference sign Gc indicates changes in the spectrum when the quadrature deviation between the in-phase component and the quadrature-phase component of the signal S' is changed from 0 (rad) to 0.1 (rad) to 0.2 (rad) to 0.3 (rad). As the quadrature deviation increases, the power of the crosstalk component Nc of the lower sideband also increases.

As described above, the power of the crosstalk component Nc increases with the magnitude of the IQ imbalance. Therefore, the crosstalk component Nc of the lower sideband of the signal S' is extracted by the BPF 990, and the power is detected by the power detecting unit 991, so that the magnitude of the IQ imbalance can be monitored.

Figure 4:
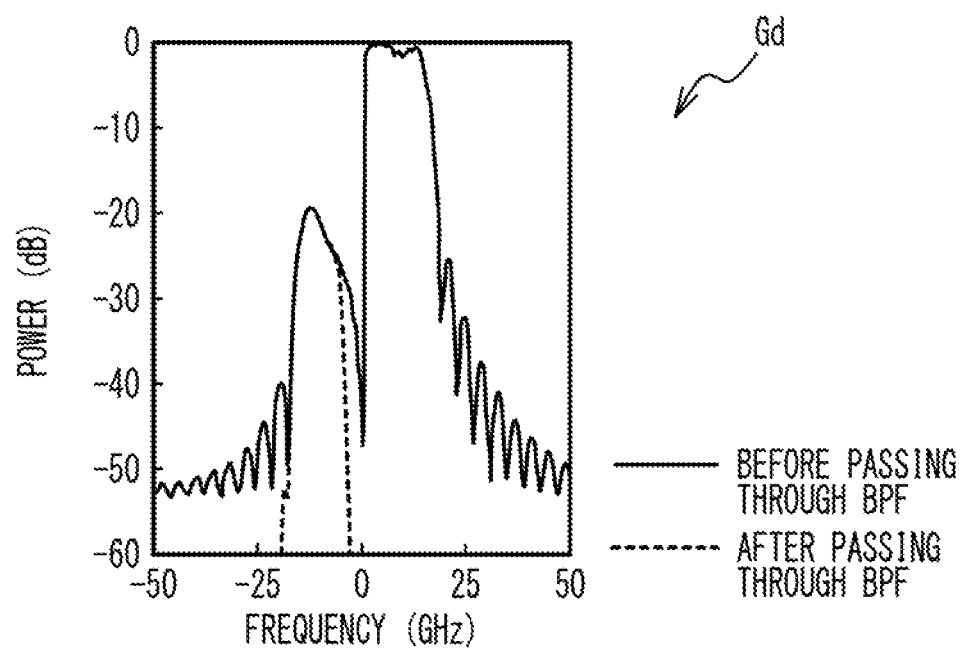
FIG. 4 shows waveform charts each indicating an example of the spectrum of a signal that has passed through a bandpass filter.
Figure 4:
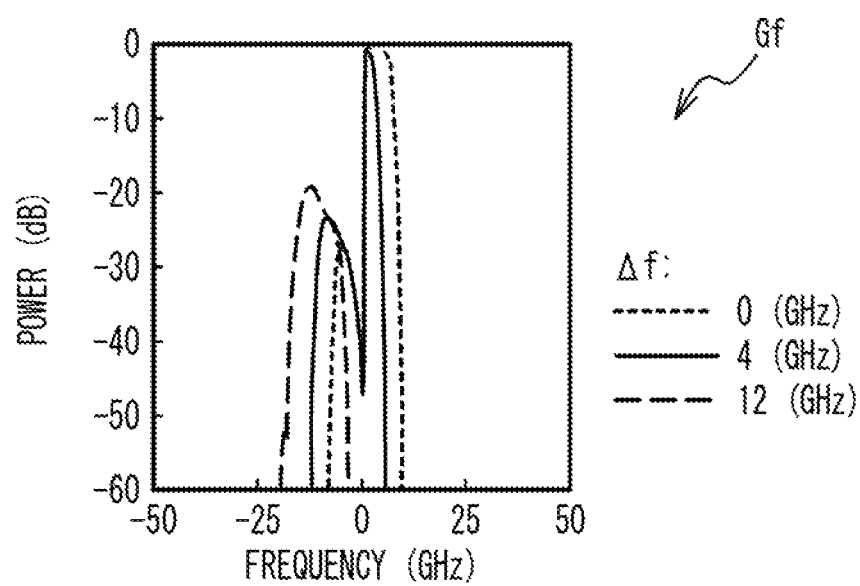

FIG. 4 shows waveform charts showing example spectrums of a signal S' that has passed through the BPF 990. Reference sign Gd indicates the spectrum of the signal S' before and after the signal S' passes through the BPF 990 in a case where the skew is 3 (ps). In this manner, the BPF 990 can extract the crosstalk component Nc from the signal S'.

Reference sign Gf indicates changes in the spectrum when the difference Δf between the center frequency fo of the signal S' and the center frequency fc of the passband B is set at 0 (GHz), 4 (GHz), and 12 (GHz) in a case where the skew is 3 (ps). In this example, in a case where the difference Δf is 12 (GHz), the crosstalk component Nc can be extracted in a most preferred manner.

Figure 5:
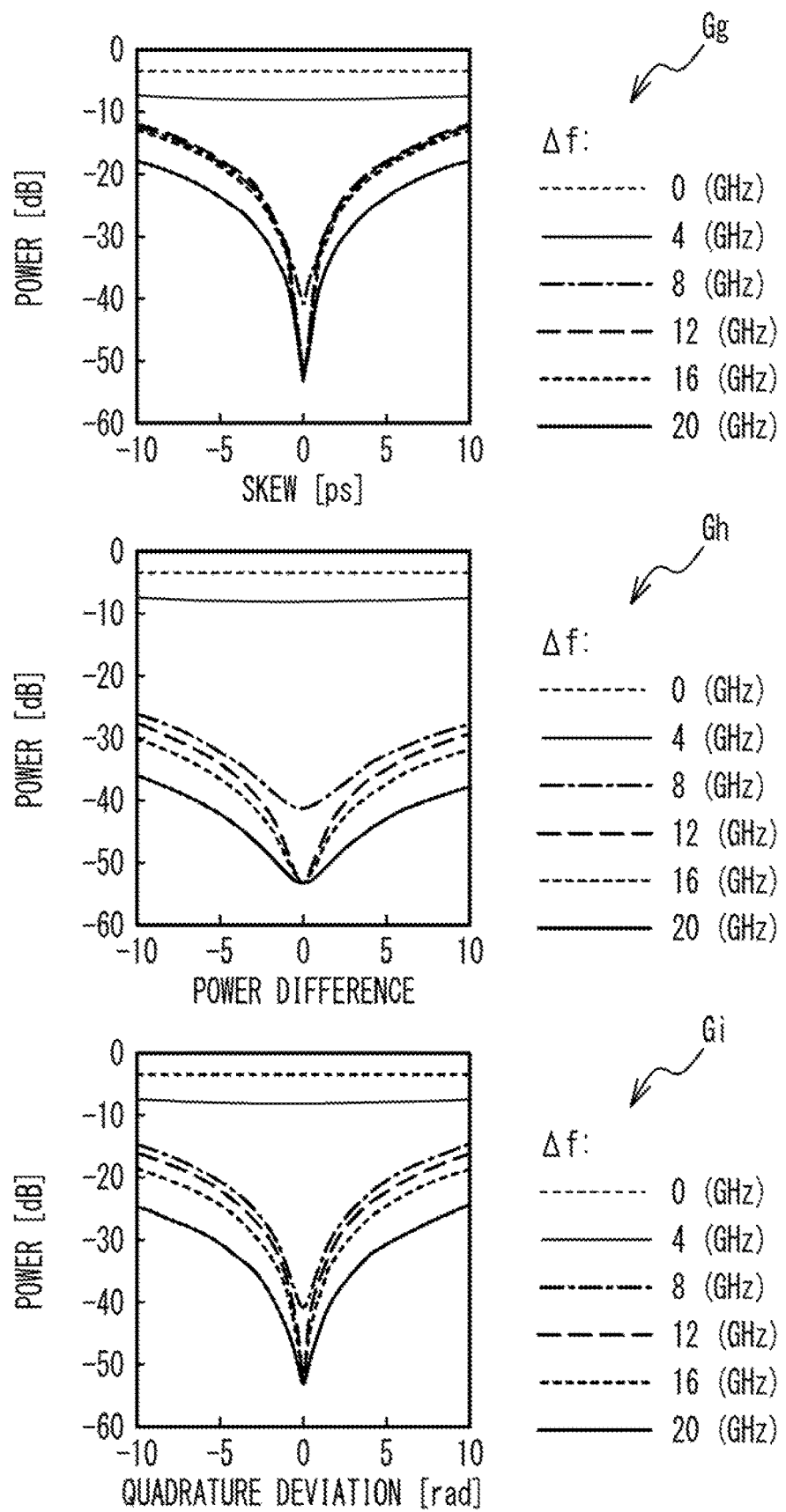
FIG. 5 shows waveform charts each indicating an example of changes in the power of a crosstalk component depending on the center frequency of the passband of a bandpass filter.

FIG. 5 is a waveform chart showing example changes in the power of the crosstalk component Nc depending on the center frequency fc of the passband of the BPF 990. Reference sign Gg indicates the changes in the power with respect to the skew when the difference Δf is set at 0 (GHz), 4 (GHz), 8 (GHz), 12 (GHz), 16 (GHz), and 20 (GHz). Reference sign Gh indicates the changes in the power with respect to the power difference when the difference Δf is set at 0 (GHz), 4 (GHz), 8 (GHz), 12 (GHz), 16 (GHz), and 20 (GHz). Reference sign Gi indicates the changes in the power with respect to the quadrature deviation when the difference Δf is set at 0 (GHz), 4 (GHz), 8 (GHz), 12 (GHz), 16 (GHz), and 20 (GHz).

As can be seen from the graphs indicated by reference signs Gg through Gi, in the cases where the difference Δf is 0 (GHz) or 4 (GHz), the component in the upper sideband of the signal S' is stronger, and therefore, IQ imbalance monitoring cannot be performed. However, in the cases where the difference Δf is 8 (GHz), 12 (GHz), 16 (GHz), or 20 (GHz), the component in the lower sideband of the signal S' is strong, and therefore, IQ imbalance monitoring can be performed.

Therefore, the imbalance compensation device of the embodiment compensates for an IQ imbalance by adjusting the power difference, the skew, and the quadrature deviation between the in-phase component and the quadrature-phase component, in accordance with the results of IQ imbalance monitoring.

Figure 6:
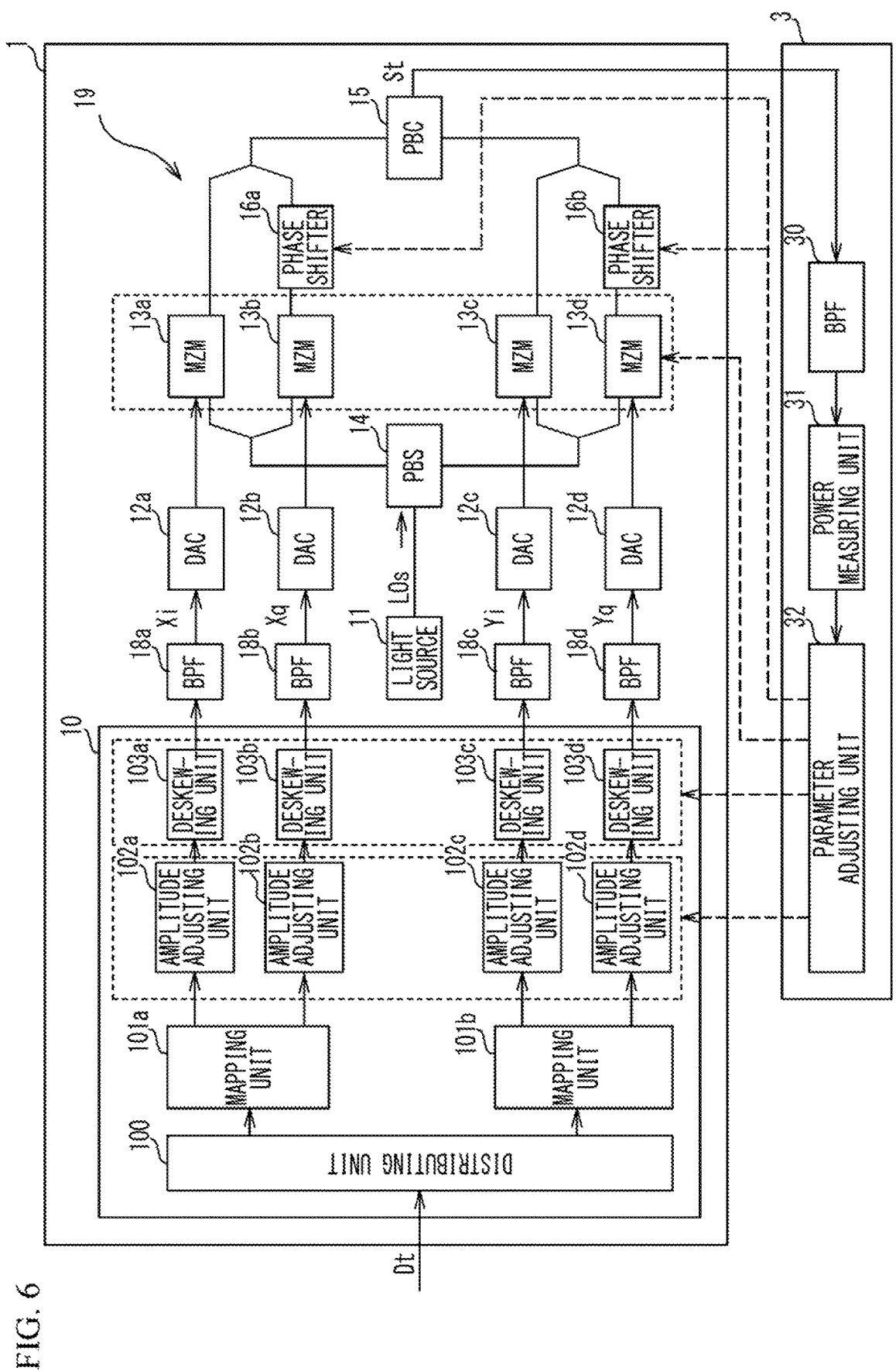
FIG. 6 is a configuration diagram showing an example of a transmission device and an imbalance compensation device.

FIG. 6 is a configuration diagram showing an example of a transmission device 1 and an imbalance compensation device 3. The imbalance compensation device 3 monitors the IQ imbalance in the transmission device 1 from a test signal St transmitted from the transmission device 1, and, for the transmission device 1, adjusts the power difference, the skew, and the quadrature deviation between the in-phase component and the quadrature-phase component of the test signal St, in accordance with the results of the monitoring. The test signal St is an example of a signal containing an in-phase component and a quadrature-phase component.

The transmission device 1 transmits the test signal St according to a digital coherent optical transmission method, using a polarization multiplexing technique. The transmission device 1 includes a transmission processing circuit 10, BPFs 18*a* through 18*d*, digital-to-analog converters 12*a* through 12*d*, and an optical modulating unit 19. The optical modulating unit 19 includes a light source 11, Mach-Zehnder modulators (MZMs) 13*a* through 13*d*, a polarization beam splitter (PBS) 14, a polarization beam combiner (PBC) 15, and phase shifters 16*a* and 16*b*.

The transmission processing circuit 10 generates four digital signals Xi, Xq, Yi, and Yq from a data signal Dt input from another device. The transmission processing circuit 10 includes a distributing unit 100, mapping units 101*a* and 101*b*, amplitude adjusting units 102*a* through 102*d*, and deskewing units 103*a* through 103*d*. The transmission processing circuit 10 may be a digital signal processor (DSP), for example. However, the transmission processing circuit 10 is not necessarily a DSP, but may be a field programmable gate array (FPGA), for example. Further, the transmission processing circuit 10 may include functions other than the above.

The distributing unit 100 distributes the data signal Dt to the mapping units 101*a* and 101*b*. The mapping units 101*a* and 101*b* map the data signal Dt as symbols for a modulation process (such as QAM). The mapping unit 101*a* performs a mapping process on the data signal Dt to be assigned to X-polarization. The mapping unit 101*b* performs a mapping process on the data signal Dt to be assigned to Y-polarization.

The mapping unit 101*a* outputs the in-phase component of the data signal Dt of the X-polarization to the amplitude adjusting unit 102*a*, and outputs the quadrature-phase component to the amplitude adjusting unit 102*b*. The mapping unit 101*b* outputs the in-phase component of the data signal Dt of the Y-polarization to the amplitude adjusting unit 102*c*, and outputs the quadrature-phase component to the amplitude adjusting unit 102*d*.

The amplitude adjusting units 102*a* through 102*d* each include an amplifying circuit and the like, and adjust the amplitudes of the signal components input from the mapping units 101*a* and 101*b*, in accordance with a set value supplied from the imbalance compensation device 3. The signal components subjected to the amplitude adjustment are input to the deskewing units 103*a* through 103*d*. It should be noted that the amplitude adjusting units 102*a* through 102*d* may be provided in a stage later than the deskewing units 103*a* through 103*d*.

The deskewing units 103*a* through 103*d* each include a delay inserting circuit and the like, and adjust the skews of the signal components input from the amplitude adjusting units 102*a* through 102*d*, in accordance with a set value supplied from the imbalance compensation device 3. The signal components subjected to the skew adjustment are input to the BPFs 18*a* through 18*d*.

The BPFs 18*a* through 18*d* are electrical filters, and extract the signal components in a predetermined passband from the signal components input from the deskewing units 103*a* through 103*d*. More specifically, the BPFs 18*a* through

18*d* extract signal components in a predetermined passband, to generate an SSB signal like the one indicated by reference sign G2 in FIG. 1.

Alternatively, the BPFs 18*a* through 18*d* do not necessarily generate an SSB signal, but may generate a signal having a difference between the mean power value of the signal component in the upper sideband and the mean power value of the signal component in the lower sideband, as indicated by reference sign G3 in FIG. 1. That is, the BPFs 18*a* through 18*d* are examples of the converting unit, and convert a signal so that the power of the signal component in the upper sideband of the signal and the power of the signal component in the lower sideband of the signal differ from each other.

The BPF 18*a* outputs the extracted signal as the digital signal Xi of the in-phase component of the X-polarization to the DAC 12*a*, and the BPF 18*b* outputs the extracted signal as the digital signal Xq of the quadrature-phase component of the X-polarization to the DAC 12*b*. The BPF 18*c* outputs the extracted signal as the digital signal Yi of the in-phase component of the Y-polarization to the DAC 12*c*, and the BPF 18*d* outputs the extracted signal as the digital signal Yq of the quadrature-phase component of the Y-polarization to the DAC 12*d*.

The DACs 12*a* through 12*d* convert the digital signals Xi, Xq, Yi, and Yq into analog signals. The analog signals are input to the MZMs 13*a* through 13*d*. It should be noted that the DACs 12*a* through 12*d* may be formed in the transmission processing circuit 10. The amplitude adjusting units 102*a* through 102*d* and the deskewing units 103*a* through 103*d* are provided in stages earlier than the DAC 12*a* through 12*d*, but may be provided in stages later than the DACs 12*a* through 12*d*.

The light source 11 is a laser diode (LD), for example, and outputs local oscillation light LOs at a predetermined frequency to the PBS 14. The PBS 14 divides the local oscillation light LOs between the X-axis and the Y-axis (polarizing axes). The X-axis component of the local oscillation light LOs is input to each of the MZMs 13*a* and 13*b*, and the Y-axis component of the local oscillation light LOs is input to each of the MZMs 13*c* and 13*d*.

The MZMs 13*a* through 13*d* optically modulate the local oscillation light LOs in accordance with the analog signals from the DACs 12*a* through 12*d*. More specifically, the MZMs 13*a* and 13*b* optically modulate the X-axis component of the local oscillation light LOs in accordance with the analog signals from the DACs 12*a* and 12*b*, and the MZMs 13*c* and 13*d* optically modulate the Y-axis component of the local oscillation light LOs in accordance with the analog signals from the DACs 12*c* and 12*d*.

The phase shifters 16*a* and 16*b* are connected to the stages after the MZMs 13*b* and 13*d* corresponding to the quadrature-phase components (Xq, Yq). The phase shifters 16*a* and 16*b* are formed with phase modulators or the like, and shift the phases of light output from the MZMs 13*b* and 13*d* by $\pi/2$. The phase shifters 16*a* and 16*b* also adjust the phase shift amount ($\pi/2$) in accordance with a set value supplied from the imbalance compensation device 3. Accordingly, the phase shift amount is a value obtained by adding a fine adjustment value based on the set value to $\pi/2$.

The X-axis component and the Y-axis component of the optically-modulated local oscillation light LOs are input to the PBC 15. The PBC 15 performs polarization combining of the X-axis component and the Y-axis component of the local oscillation light LOs, and outputs the resultant signal as the test signal St to the imbalance compensation device 3.

The imbalance compensation device 3 includes a BPF 30, a power measuring unit 31, and a parameter adjusting unit 32. The imbalance compensation device 3 compensates for the IQ imbalance in the transmission device 1 with respect to each kind of polarization.

Therefore, in a case where the IQ imbalance is to be compensated for with respect to the X-polarization, the parameter adjusting unit 32 puts the digital signals Yi and Yq of the Y-polarization into an unmodulated state by controlling and stopping the operations of the MZMs 13*c* and 13*d* of the Y-polarization. Likewise, in a case where the IQ imbalance is to be compensated for with respect to the Y-polarization, the parameter adjusting unit 32 puts the digital signals Xi and Xq of the X-polarization into an unmodulated state by controlling and stopping the operations of the MZMs 13*a* and 13*b* of the X-polarization. It should be noted that the parameter adjusting unit 32 may switching on and off an optical switch, for example, to perform control so that only one of the X-axis component and the Y-axis component of the local oscillation light LOs is input to the MZMs 13*a* through 13*d*.

The BPF 30 is an optical filter. The BPF 30 receives the test signal St input from the PBC 15, and passes the signal component in the upper sideband or the lower sideband of the test signal St. That is, the BPF 30 is an example of the extracting unit, and extracts the signal component in the upper sideband or the lower sideband from the test signal St.

For example, in a case where the test signal St indicated by reference signs G2 and G3 in FIG. 1 is input to the BPF 30, the BPF 30 extracts the signal component in the lower sideband Sb. In a case where the test signal St indicated by reference sign G4 in FIG. 1 is input to the BPF 30, the BPF 30 extracts the signal component in the upper sideband Sa. That is, the BPF 30 extracts the signal component in the upper sideband Sa or the signal component in the lower sideband Sb, whichever has the smaller power (mean value).

As a result, the crosstalk component generated in the test signal St due to the IQ imbalance is extracted by the BPF 30. The signal component extracted by the BPF 30 is input to the power measuring unit 31.

The power measuring unit 31 is formed with a photodiode, for example, and measures the power of the signal component extracted by the BPF 30. Thus, the imbalance compensation device 3 can monitor the magnitude of the IQ imbalance in the transmission device 1, in accordance with the power measured by the power measuring unit 31. The power measuring unit 31 notifies the parameter adjusting unit 32 of the measured power. It should be noted that the power measuring unit 31 is an example of the measuring unit.

The parameter adjusting unit 32 is an example of the adjusting unit, and adjusts the parameters related to the IQ imbalance, in accordance with the power measured by the power measuring unit 31. The parameter adjusting unit 32 is formed with an FPGA, for example, and adjusts the respective set values of the amplitude adjusting units 102*a* through 102*d*, the deskewing units 103*a* through 103*d*, and the phase shifters 16*a* and 16*b*. The respective set values are an example of the parameters related to the IQ imbalance.

As described above, the imbalance compensation device 3 measures the power of the test signal St having a difference between the mean power value of the signal component in the upper sideband and the mean power value of the signal component in the lower sideband, and, in accordance with the power, compensates for the imbalance between the in-phase component and the quadrature-phase component, or the IQ imbalance, of the test signal St. Thus, the imbalance compensation device 3 can readily compensate for the IQ imbalance.

More specifically, the parameter adjusting unit 32 adjusts the respective set values of the amplitude adjusting units 102a through 102d, the deskewing units 103a through 103d, and the phase shifters 16a and 16b so that the power is minimized. Accordingly, the imbalance compensation device 3 can minimize the magnitude of the IQ imbalance by minimizing the crosstalk component.

Although the imbalance compensation device 3 is provided independently of the transmission device 1 in this example, the imbalance compensation device 3 may be provided inside the transmission device 1. In that case, the transmission device 1 further includes the BPF 30, the power measuring unit 31, and the parameter adjusting unit 32. Thus, the transmission device 1 can achieve the same effects as those described above.

Figure 7:
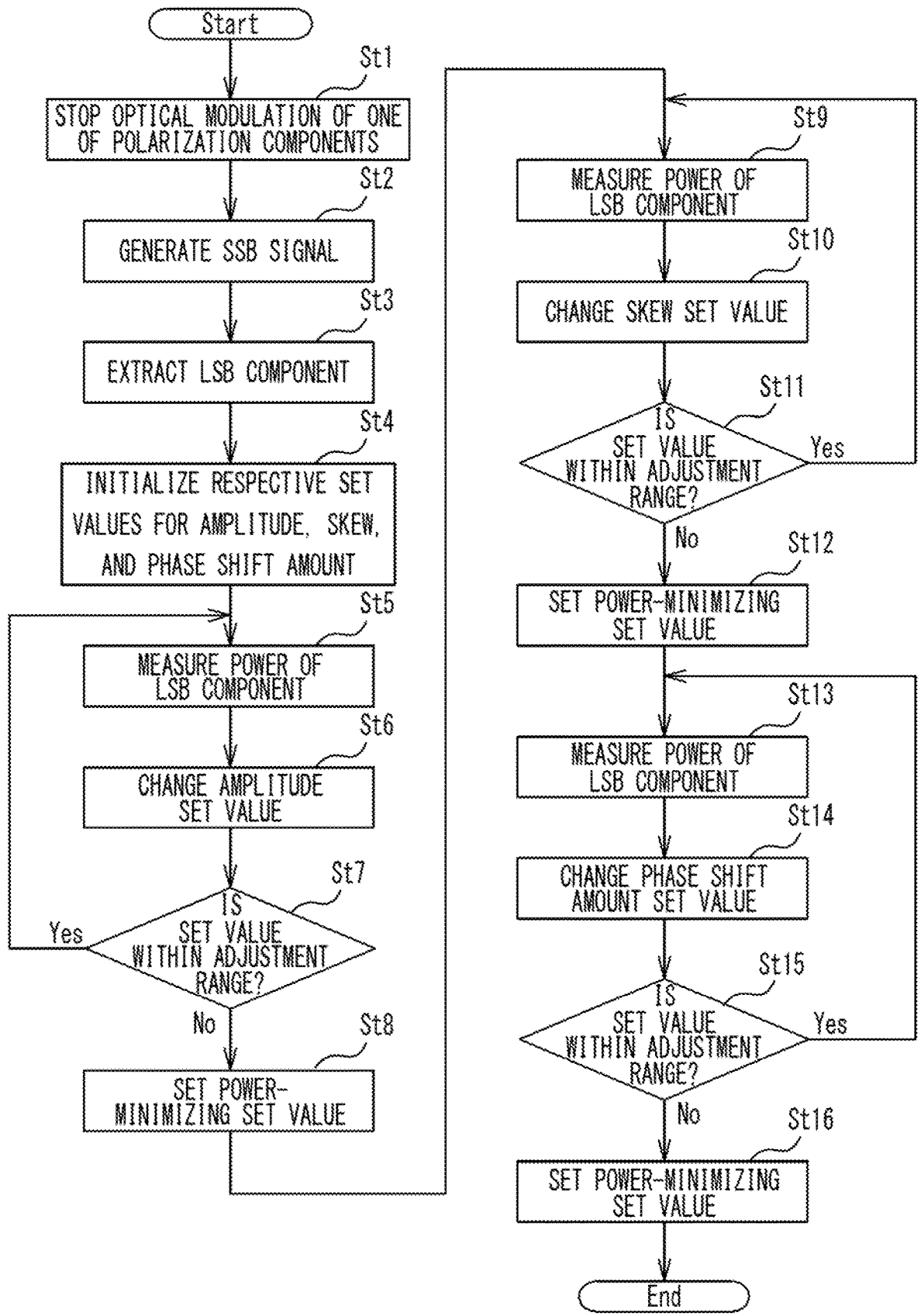
FIG. 7 is a flowchart showing an example of an IQ imbalance compensation process in the transmission device.

FIG. 7 is a flowchart showing an example of the IQ imbalance compensation process in the transmission device 1. The parameter adjusting unit 32 stops the optical modulation of one of the polarization components of the X-axis and the Y-axis (step SU). In a case where the IQ imbalance is to be compensated for with respect to the X-polarization, the parameter adjusting unit 32 in this step controls and stops the operations of the MZMs 13c and 13d of the Y-polarization. In a case where the IQ imbalance is to be compensated for with respect to the Y-polarization, the parameter adjusting unit 32 in this step controls and stops the operations of the MZMs 13a and 13b of the X-polarization.

In the procedures thereafter, only the IQ imbalance compensation process with respect to either the X-polarization or the Y-polarization is performed, but the same process is also performed with respect to the other polarization. In a case where the IQ imbalance is compensated for with respect to the X-polarization, the parameter adjusting unit 32 adjusts the respective set values of the amplitude adjusting units 102a and 102b, the deskewing units 103a and 103b, and the phase shifter 16a.

Likewise, in a case where the IQ imbalance is compensated for with respect to the Y-polarization, the parameter adjusting unit 32 adjusts the respective set values of the amplitude adjusting units 102c and 102d, the deskewing units 103c and 103d, and the phase shifter 16b. In the description below, however, the respective adjusted values of the amplitude adjusting units 102a through 102d, the deskewing units 103a through 103d, and the phase shifters 16a and 16b will be collectively described as the adjustment targets.

The BPFs 18a through 18d generate an SSB signal by extracting the signal component in the upper sideband or the lower sideband from the data signal Dt (step St2). An SSB signal having its signal band in the upper sideband in this example. However, the SSB signal does not necessarily have the signal band in the upper sideband, but may have its signal band in the lower sideband.

The BPFs 18a through 18d do not necessarily generate an SSB signal, but may generate a signal having a difference between the mean power value of the signal component in the upper sideband and the mean power value of the signal component in the lower sideband. That is, the BPFs 18a through 18d convert the transmission target signal into a signal having a difference between the mean power value of the signal component in the upper sideband and the mean power value of the signal component in the lower sideband.

The BPF 30 then extracts the signal component in the lower sideband (LSB component) from the test signal St (step St3). As a result, the crosstalk component generated in the test signal St due to the IQ imbalance in the transmission device 1 is extracted. However, in a case where the SSB signal generated in step St2 has the signal band in the lower sideband, the BPF 30 extracts the signal component in the upper sideband (USB component) from the test signal St.

The parameter adjusting unit 32 then initializes the respective set values of the amplitude adjusting units 102a through 102d, the amplitude adjusting units 102a through 102d, the deskewing units 103a through 103d, and the phase shifters 16a and 16b (step St4). In the procedures thereafter, the parameter adjusting unit 32 sequentially adjusts the respective set values of the deskewing units 103a through 103d and the phase shifters 16a and 16b. However, the adjustment is not limited to this order, and only one of the set values may be adjusted. In the description below, the respective set values of the amplitude adjusting units 102a through 102d, the deskewing units 103a through 103d, and the phase shifters 16a and 16b will be referred to as "the amplitude set value", "the skew set value", and "the phase shift amount set value".

The power measuring unit 31 measures the power of the signal component in the lower sideband extracted by the BPF 30 (step St5). The measured power (measured value) is reported to the parameter adjusting unit 32, and is stored into a storage such as a memory in the parameter adjusting unit 32.

The parameter adjusting unit 32 then changes the amplitude set value (step St6). For example, the parameter adjusting unit 32 increases the set value by a predetermined value. The parameter adjusting unit 32 then determines whether the set value is within a predetermined adjustment range (step St7). The set value adjustment range is determined from the functions of the amplitude adjusting units 102a through 102d, for example.

If the set value is within the adjustment range (Yes in step St7), the procedures in step St5 and the steps that follow are again carried out. If the set value is outside the adjustment range (No in step St7), the parameter adjusting unit 32 sets such a set value in the amplitude adjusting units 102a through 102d as to minimize the power of the signal component in the lower sideband (step St8). With this, the imbalance compensation device 3 can minimize the power difference between the in-phase component and the quadrature-phase component.

The power measuring unit 31 then measures the power of the signal component in the lower sideband extracted by the BPF 30 (step St9). The measured power is reported to the parameter adjusting unit 32, and is stored into a storage such as a memory in the parameter adjusting unit 32.

The parameter adjusting unit 32 then changes the skew set value (step St10). For example, the parameter adjusting unit 32 increases the set value by a predetermined value. The parameter adjusting unit 32 then determines whether the set value is within a predetermined adjustment range (step St11). The set value adjustment range is determined from the functions of the deskewing units 103a through 103d, for example.

If the set value is within the adjustment range (Yes in step St11), the procedures in step St9 and the steps that follow are again carried out. If the set value is outside the adjustment range (No in step St11), the parameter adjusting unit 32 sets such a set value in the deskewing units 103a through 103d as to minimize the power of the signal component in the lower sideband (step St12). With this, the imbalance compensation device 3 can minimize the skew between the in-phase component and the quadrature-phase component.

The power measuring unit 31 then measures the power of the signal component in the lower sideband extracted by the BPF 30 (step St13). The measured power is reported to the parameter adjusting unit 32, and is stored into a storage such as a memory in the parameter adjusting unit 32.

The parameter adjusting unit 32 then changes the phase shift amount set value (step St14). For example, the parameter adjusting unit 32 increases the set value by a predetermined value. The parameter adjusting unit 32 then determines whether the set value is within a predetermined adjustment range (step St15). The set value adjustment range is determined from the functions of the phase shifters 16*a* and 16*b*, for example.

If the set value is within the adjustment range (Yes in step St15), the procedures in step St13 and the steps that follow are again carried out. If the set value is outside the adjustment range (No in step St15), the parameter adjusting unit 32 sets such a set value in the phase shifters 16*a* and 16*b* as to minimize the power of the signal component in the lower sideband (step St16). With this, the imbalance compensation device 3 can minimize the quadrature deviation between the in-phase component and the quadrature-phase component.

In this manner, the IQ imbalance compensation process is performed. An imbalance compensation method based on this compensation process can achieve the same effects as those of the imbalance compensation device 3.

In this example, the BPF 30 extracts the crosstalk component from the test signal St. However, the BPF 30 does not necessarily extract the crosstalk component, but may extract a signal component of the source of the crosstalk component. For example, in a case where the test signal St has the spectrum indicated by reference sign G2 in FIG. 1, the BPF 30 extracts the signal component in the upper sideband Sa. In a case where the test signal St has the spectrum indicated by reference sign G4 in FIG. 1, the BPF 30 extracts the signal component in the lower sideband Sb.

That is, the BPF 30 extracts the signal component in the upper sideband Sa or the signal component in the lower sideband Sb, whichever has the greater power (mean value). Where the crosstalk component is larger, the extracted signal component has a smaller power. Therefore, the parameter adjusting unit 32 adjusts the respective set values of the amplitude adjusting units 102*a* through 102*d*, the deskewing units 103*a* through 103*d*, and the phase shifters 16*a* and 16*b* so that the power measured by the power measuring unit 31 is maximized. The compensation process in this case is described below.

Figure 8:
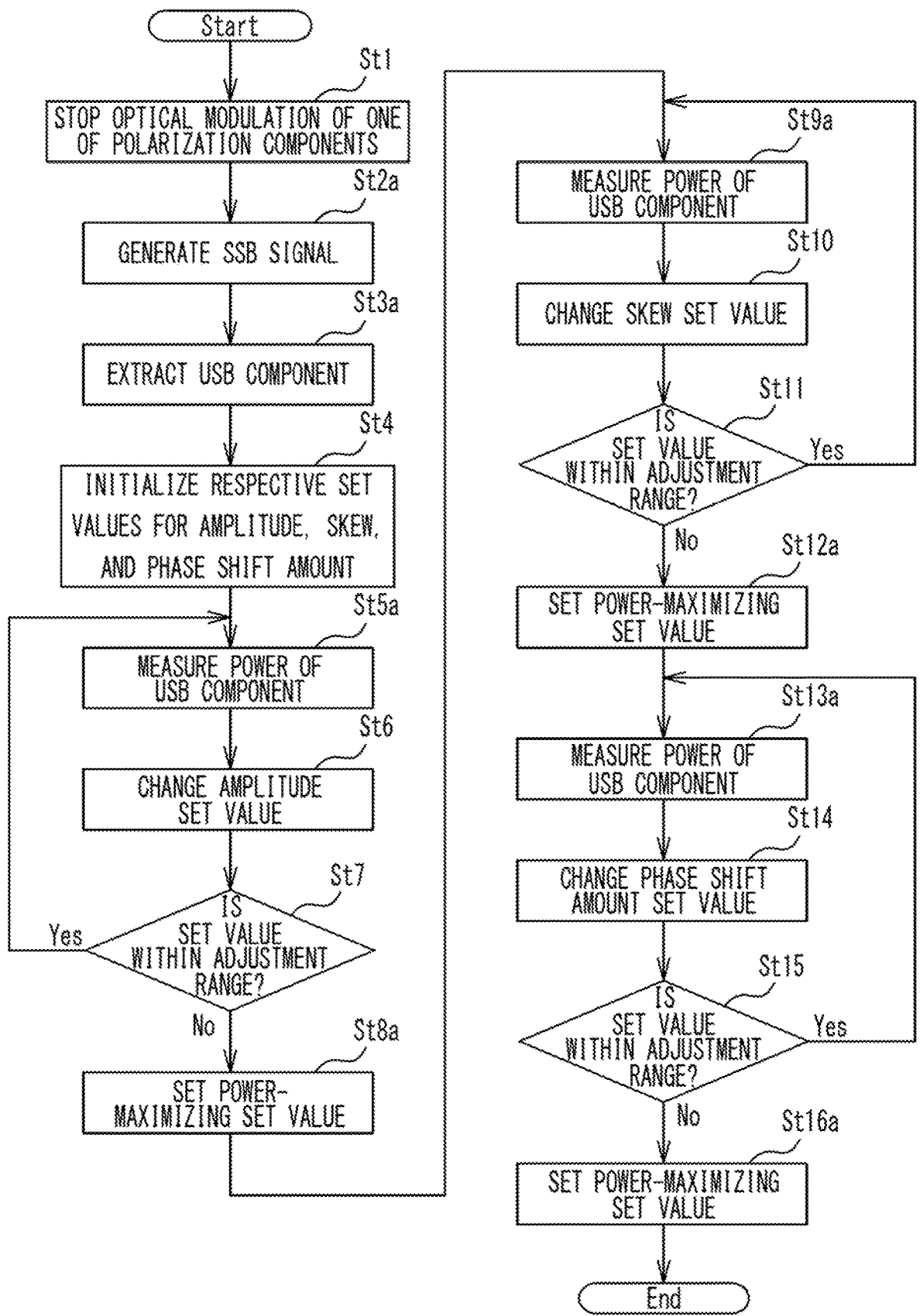
FIG. 8 is a flowchart showing another example of an IQ imbalance compensation process in the transmission device.

FIG. 8 is a flowchart showing another example of the IQ imbalance compensation process in the transmission device 1. In FIG. 8, the same procedures as those shown in FIG. 7 are denoted by the same reference signs as those used in FIG. 7, and explanation thereof will not be repeated.

The BPFs 18*a* through 18*d* generate an SSB signal having its signal band in the lower sideband (step St2*a*). The BPF 30 then extracts the signal component in the upper sideband (USB component), which is the cross-talk component, from the test signal St (step St3*a*).

The power measuring unit 31 measures the power of the signal component in the upper sideband (USB component) (steps St5*a*, St9*a*, and St13*a*). The parameter adjusting unit 32 sets the respective set values so that the measured power is maximized (steps St8*a*, St12*a*, and St16*a*).

Thus, the imbalance compensation device 3 can minimize the power difference, the skew, and the quadrature deviation between the in-phase component and the quadrature-phase component, by minimizing the crosstalk component.

Next, a case where an IQ imbalance in a reception device is compensated for is described.

Figure 9:
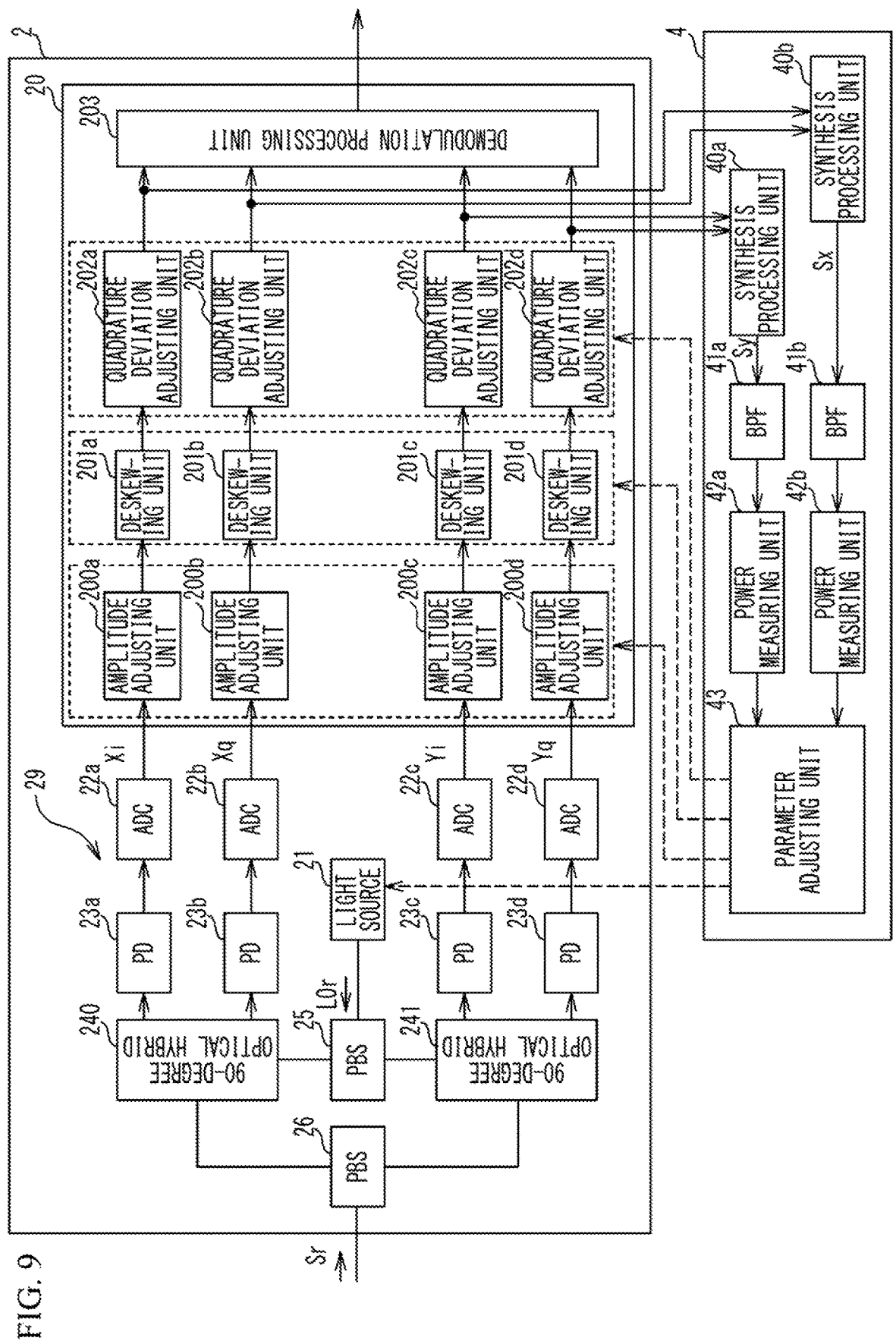
FIG. 9 is a configuration diagram showing an example of a reception device and an imbalance compensation device.

FIG. 9 is a configuration diagram showing an example of a reception device 2 and an imbalance compensation device 4. The reception device 2 receives a test signal Sr containing an in-phase component and a quadrature-phase component. The imbalance compensation device 4 compensates for an IQ imbalance in the reception device 2. The test signal Sr has a different power at each frequency in the band in which the reception device 2 can perform reception.

The reception device 2 includes a reception processing circuit 20, analog-to-digital converters (ADCs) 22*a* through 22*d*, and a coherent receiver 29. The coherent receiver 29 includes a light source 21, photodiodes (PDs) 23*a* through 23*d*, 90-degree optical hybrid circuits 240 and 241, and PBSs 25 and 26.

The PBS 26 divides an input test signal Sr into an X-axis component and a Y-axis component, and outputs the X-axis component and the Y-axis component to the 90-degree optical hybrid circuits 240 and 241, respectively. The light source 21 inputs local oscillation light LOr to the PBS 25. The PBS 25 divides the local oscillation light LOr into an X-axis component and a Y-axis component, and outputs the X-axis component and the Y-axis component to the 90-degree optical hybrid circuits 240 and 241, respectively.

The 90-degree optical hybrid circuit 240 has a waveguide for causing the X-axis component of the test signal Sr and the X-axis component of the local oscillation light LOr to interfere with each other, and detects the X-axis component of the test signal Sr. As a result of the detection, the 90-degree optical hybrid circuit 240 outputs optical components corresponding to the amplitudes and the phases of the in-phase component and the quadrature-phase component to the PDs 23*a* and 23*b*, respectively.

The 90-degree optical hybrid circuit 241 has a waveguide for causing the Y-axis component of the test signal Sr and the Y-axis component of the local oscillation light LOr to interfere with each other, and detects the Y-axis component of the test signal Sr. As a result of the detection, the 90-degree optical hybrid circuit 241 outputs optical components corresponding to the amplitudes and the phases of the in-phase component and the quadrature-phase component to the PDs 23*c* and 23*d*, respectively.

The PDs 23*a* through 23*d* convert the input optical components into electrical signals, and output the electrical signals to the ADCs 22*a* through 22*d*, respectively. The ADCs 22*a* through 22*d* convert the electrical signals input from the PDs 23*a* through 23*d* into digital signals Xi, Xq, Yi, and Yq, respectively. The digital signals Xi, Xq, Yi, and Yq are input to the reception processing circuit 20.

The center frequency of the local oscillation light LOr of the light source 21 is set at a different value from the center frequency of the test signal Sr by the imbalance compensation device 4. Thus, the test signal Sr is converted into an SSB signal.

Figure 10:
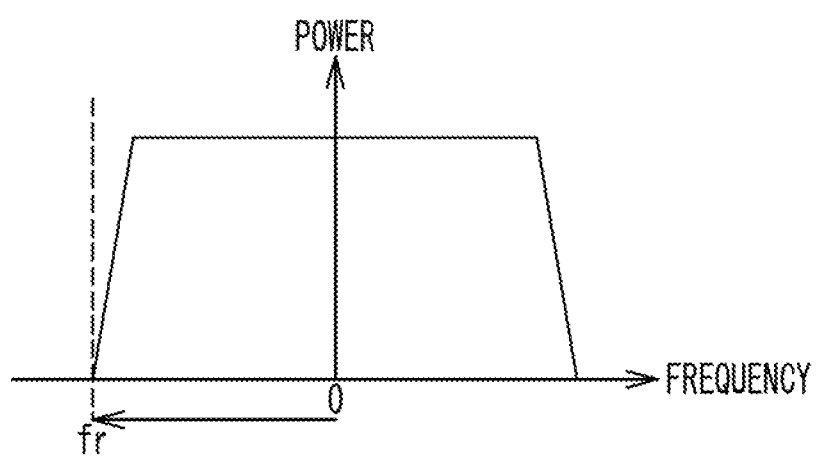
FIG. 10 is a graph showing an example of the center frequency of local oscillation light of the reception device.

FIG. 10 is a graph showing an example of the center frequency fr of the local oscillation light LOr of the reception device 2. The center frequency fr of the local oscillation light LOr is set at the frequency of the edge of the lower sideband of the spectrum of the test signal Sr, instead of the center frequency of the test signal Sr. As a result, the test signal Sr becomes an SSB signal having its signal band in the upper sideband. However, the test signal Sr may be an SSB signal having its signal band in the lower sideband. Further, the test signal Sr is not necessarily an SSB signal, but may be a signal having a difference between the power of the signal component in the upper sideband and the power of the signal component in the lower sideband.

In this manner, the light source 21 as an example of the converting unit converts the test signal S so that the power (mean value) of the signal component in the upper sideband of the test signal Sr and the power (mean value) of the signal component in the lower sideband of the test signal Sr differ from each other. Therefore, the transmission device 1 does not need to convert the test signal Sr. Thus, the imbalance compensation device 4 can compensate for the IQ imbalance, using the signal component extracted from the converted test signal Sr as described later.

The reception processing circuit 20 includes amplitude adjusting units 200a through 200d, deskewing units 201a through 201d, quadrature deviation adjusting units 202a through 202d, and a demodulation processing unit 203. The reception processing circuit 20 may be a DSP, for example. However, the reception processing circuit 20 is not necessarily a DSP, but may be an FPGA, for example. Further, the reception processing circuit 20 may include functions other than the above.

The amplitude adjusting units 200a through 200d each include an amplifying circuit and the like, and adjust the amplitudes of the digital signals Xi, Xq, Yi, and Yq input from the ADCs 22a through 22d, in accordance with a set value supplied from the imbalance compensation device 4. The digital signals Xi, Xq, Yi, and Yq subjected to the amplitude adjustment are input to the deskewing units 201a through 201d.

The deskewing units 201a through 201d each include a delay inserting circuit and the like, and adjust the skews of the digital signals Xi, Xq, Yi, and Yq input from the amplitude adjusting units 200a through 200d, in accordance with a set value supplied from the imbalance compensation device 4. The digital signals Xi, Xq, Yi, and Yq subjected to the skew adjustment are input to the demodulation processing unit 203. The demodulation processing unit 203 performs a demodulation process on the digital signals Xi, Xq, Yi, and Yq.

It should be noted that the amplitude adjusting units 200a through 200d may be provided in a stage later than the deskewing units 201a through 201d. The amplitude adjusting units 200a through 200d and the deskewing units 201a through 201d are provided in stages later than the ADCs 22a through 22d in this example, but may be provided in stages earlier than the ADCs 22a through 22d. Although the digital signals Xi, Xq, Yi, and Yq from a stage later than the ADC 22a through 22d are input to the imbalance compensation device 4 in this example, analog signals from a stage earlier than the ADCs 22a through 22d may be input to the imbalance compensation device 4. In such a case, however, the amplitude adjusting units 200a through 200d and the deskewing units 201a through 201d are provided in stages earlier than the ADCs 22a through 22d.

The imbalance compensation device 4 includes synthesis processing units 40a and 40b, BPFs 41a and 41b that are electrical filters, power measuring units 42a and 42b, and a parameter adjusting unit 43. The synthesis processing unit 40a, the BPF 41a, and the power measuring unit 42a are used in an IQ imbalance compensation process with respect to the digital signals Yi and Yq of Y-polarization, and the synthesis processing unit 40b, the BPF 41b, and the power measuring unit 42b are used in an IQ imbalance compensation process with respect to the digital signals Xi and Xq of X-polarization.

The synthesis processing unit 40a includes a circuit such as an adder, and generates a signal Sy of Y-polarization from the digital signals Yi and Yq. The signal Sy is input to the BPF 41a.

The BPF 41a is an example of the extracting unit, and extracts the signal component in the upper sideband or the signal component in the lower sideband from the signal Sy. In a case where the signal Sy is an SSB signal having its signal band in the upper sideband, the BPF 41a extracts the signal component in the lower sideband of the signal Sy. In a case where the signal Sy is an SSB signal having its signal band in the lower sideband, the BPF 41a extracts the signal component in the upper sideband of the signal Sy. As a result, the crosstalk component generated in the signal Sy due to an IQ imbalance is extracted. The signal component extracted by the BPF 41a is input to the power measuring unit 42a.

The power measuring unit 42a is an example of the measuring unit, and measures the power of the signal component extracted by the BPF 41a. More specifically, the power measuring unit 42a measures the power of the crosstalk component of the signal Sy. The measured power is reported to the parameter adjusting unit 43.

The synthesis processing unit 40b includes a circuit such as an adder, and generates a signal Sz of X-polarization from the digital signals Xi and Xq. The signal Sx is input to the BPF 41b.

The BPF 41b is an example of the extracting unit, and extracts the signal component in the upper sideband or the signal component in the lower sideband from the signal Sx. In a case where the signal Sx is an SSB signal having its signal band in the upper sideband, the BPF 41b extracts the signal component in the lower sideband of the signal Sx. In a case where the signal Sx is an SSB signal having its signal band in the lower sideband, the BPF 41b extracts the signal component in the upper sideband of the signal Sx. As a result, the crosstalk component generated in the signal Sx due to the IQ imbalance is extracted. The signal component extracted by the BPF 41b is input to the power measuring unit 42b.

The power measuring unit 42b is an example of the measuring unit, and measures the power of the signal component extracted by the BPF 41b. More specifically, the power measuring unit 42b measures the power of the crosstalk component of the signal Sx. The measured power is reported to the parameter adjusting unit 43.

The parameter adjusting unit 43 is an example of the adjusting unit, and adjusts the parameters related to the IQ imbalance, in accordance with the powers reported from the power measuring units 42a and 42b. More specifically, with respect to the X-polarization, the parameter adjusting unit 43 adjusts the respective set values of the amplitude adjusting units 200a and 200b, the deskewing units 201a and 201b, and the quadrature deviation adjusting units 202a and 202b, in accordance with the powers reported from the power measuring unit 42b.

With respect to the Y-polarization, the parameter adjusting unit 43 adjusts the respective set values of the amplitude adjusting units 200c and 200d, the deskewing units 201c and 201d, and the quadrature deviation adjusting units 202c and 202d, in accordance with the powers reported from the power measuring unit 42a. It should be noted that the respective set values are an example of the parameters related to the IQ imbalance.

In this manner, the imbalance compensation device 4 measures the powers of the signals Sx and Sy each having a difference between the mean power value of the signal component in the upper sideband and the mean power value of the signal component in the lower sideband, and, in accordance with the powers, compensates for the imbalance between the in-phase component and the quadrature-phase component, or the IQ imbalance, of the test signal Sr. Thus, the imbalance compensation device 4 can readily compensate for the IQ imbalance.

More specifically, the parameter adjusting unit 43 adjusts the respective set values of the amplitude adjusting units 200a through 200d, the deskewing units 201a through 201d, and the quadrature deviation adjusting units 202a through 202d so that the power is minimized. Accordingly, the imbalance compensation device 4 can minimize the magnitude of the IQ imbalance by minimizing the crosstalk component.

Although the imbalance compensation device 4 is provided independently of the reception device 2 in this example, the imbalance compensation device 4 may be provided inside the reception device 2. In that case, the reception device 2 further includes the synthesis processing units 40a and 40b, the BPFs 41a and 41b, the power measuring units 42a and 42b, and the parameter adjusting unit 43. Thus, the reception device 2 can achieve the same effects as those described above.

Figure 11:
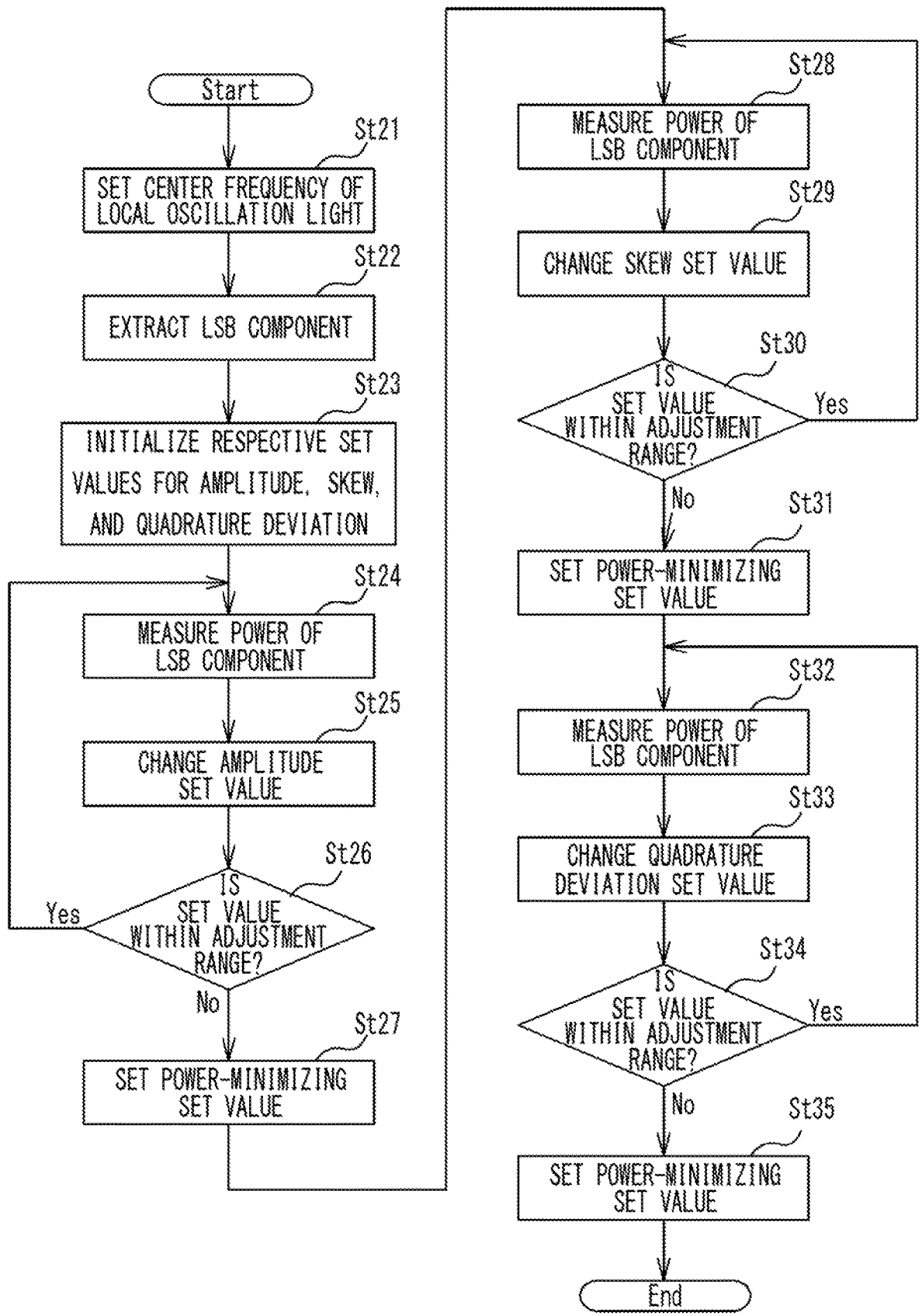
FIG. 11 is a flowchart showing an example of an IQ imbalance compensation process in the reception device.

FIG. 11 is a flowchart showing an example of the IQ imbalance compensation process in the reception device 2. In this example, only the compensation process with respect to the X-polarization or the Y-polarization is described. In the description below, however, the respective adjustment values of the amplitude adjusting units 200a through 200d, the deskewing units 201a through 201d, and the quadrature deviation adjusting units 202a through 202d will be collectively described as the adjustment targets.

The parameter adjusting unit 43 adjusts the center frequency fr of the local oscillation light LOr so that the test signal Sr is converted into an SSB signal having its signal band in the upper sideband as shown in FIG. 10 (step St21). The BPFs 41a and 41b then extract the signal component in the lower sideband (LSB component) from the signals Sx and Sy obtained from the test signal Sr (step St22). As a result, the crosstalk component generated in the test signal Sr due to the IQ imbalance in the reception device 2 is extracted. In a case where the SSB signal generated in step St 21 has its signal band in the lower sideband, the BPFs 41a and 41b extract the signal component in the upper sideband (USB component) from the test signal Sr.

The parameter adjusting unit 43 then initializes the respective set values of the amplitude adjusting units 200a through 200d, the deskewing units 201a through 201d, and the quadrature deviation adjusting units 202a through 202d (step St23). In the procedures thereafter, the parameter adjusting unit 43 sequentially adjusts the respective set values of the amplitude adjusting units 200a through 200d, the deskewing units 201a through 201d, and the quadrature deviation adjusting units 202a through 202d. However, the adjustment is not limited to this order, and only one of the set values may be adjusted. In the description below, the respective set values of the amplitude adjusting units 200a through 200d, the deskewing units 201a through 201d, and the quadrature deviation adjusting units 202a through 202d will be referred to as "the amplitude set value", "the skew set value", and "the quadrature deviation set value".

The power measuring units 42a and 42b measure the power of the signal component in the lower sideband extracted by the BPFs 41a and 41b (step St24). The measured power (measured value) is reported to the parameter adjusting unit 43, and is stored into a storage such as a memory in the parameter adjusting unit 43.

The parameter adjusting unit 43 then changes the amplitude set value (step St25). For example, the parameter adjusting unit 43 increases the set value by a predetermined value. The parameter adjusting unit 43 then determines whether the set value is within a predetermined adjustment range (step St26). The set value adjustment range is determined from the functions of the amplitude adjusting units 200a through 200d, for example.

If the set value is within the adjustment range (Yes in step St26), the procedures in step St24 and the steps that follow are again carried out. If the set value is outside the adjustment range (No in step St26), the parameter adjusting unit 43 sets such a set value in the amplitude adjusting units 200a through 200d as to minimize the power of the signal component in the lower sideband (step St27). With this, the imbalance compensation device 4 can minimize the power difference between the in-phase component and the quadrature-phase component.

The power measuring units 42a and 42b then measure the power of the signal component in the lower sideband extracted by the BPFs 41a and 41b (step St28). The measured power is reported to the parameter adjusting unit 43, and is stored into a storage such as a memory in the parameter adjusting unit 43.

The parameter adjusting unit 32 then changes the skew set value (step St29). For example, the parameter adjusting unit 43 increases the set value by a predetermined value. The parameter adjusting unit 43 then determines whether the set value is within a predetermined adjustment range (step St30). The set value adjustment range is determined from the functions of the deskewing units 201a through 201d, for example.

If the set value is within the adjustment range (Yes in step St30), the procedures in step St28 and the steps that follow are again carried out. If the set value is outside the adjustment range (No in step St30), the parameter adjusting unit 43 sets such a set value in the deskewing units 201a through 201d as to minimize the power of the signal component in the lower sideband (step St31). With this, the imbalance compensation device 4 can minimize the skew between the in-phase component and the quadrature-phase component.

The power measuring units 42a and 42b then measure the power of the signal component in the lower sideband extracted by the BPFs 41a and 41b (step St32). The measured power is reported to the parameter adjusting unit 43, and is stored into a storage such as a memory in the parameter adjusting unit 43.

The parameter adjusting unit 43 then changes the quadrature deviation set value (step St33). For example, the parameter adjusting unit 43 increases the set value by a predetermined value. The parameter adjusting unit 43 then determines whether the set value is within a predetermined adjustment range (step St34). The set value adjustment range is determined from the functions of the quadrature deviation adjusting units 202a through 202d, for example.

If the set value is within the adjustment range (Yes in step St34), the procedures in step St32 and the steps that follow are again carried out. If the set value is outside the adjustment range (No in step St34), the parameter adjusting unit 43 sets such a set value in the quadrature deviation adjusting units 202a through 202d as to minimize the power of the signal component in the lower sideband (step St35). With this, the imbalance compensation device 4 can minimize the quadrature deviation between the in-phase component and the quadrature-phase component.

In this manner, the IQ imbalance compensation process is performed. An imbalance compensation method based on this compensation process can achieve the same effects as those of the imbalance compensation device 4.

In this example, the BPFs 41*a* and 41*b* extract the crosstalk component from the test signal Sr. However, the BPFs 41*a* and 41*b* do not necessarily extract the crosstalk component, but may extract a signal component of the source of the crosstalk component. For example, in a case where the test signal Sr has the spectrum indicated by reference sign G2 in FIG. 1, the BPFs 41*a* and 41*b* extract the signal component in the upper sideband Sa. In a case where the test signal Sr has the spectrum indicated by reference sign G4 in FIG. 1, the BPFs 41*a* and 41*b* extract the signal component in the lower sideband Sb.

That is, the BPFs 41*a* and 41*b* extract the signal component in the upper sideband Sa or the signal component in the lower sideband Sb, whichever has the greater mean power value. Where the crosstalk component is larger, the extracted signal component has a smaller power. Therefore, the parameter adjusting unit 43 adjusts the respective set values of the amplitude adjusting units 200*a* through 200*d*, the deskewing units 201*a* through 201*d*, and the quadrature deviation adjusting units 202*a* through 202*d* so that the power measured by the power measuring units 42*a* and 42*b* is maximized. The compensation process in this case is described below.

Figure 12:
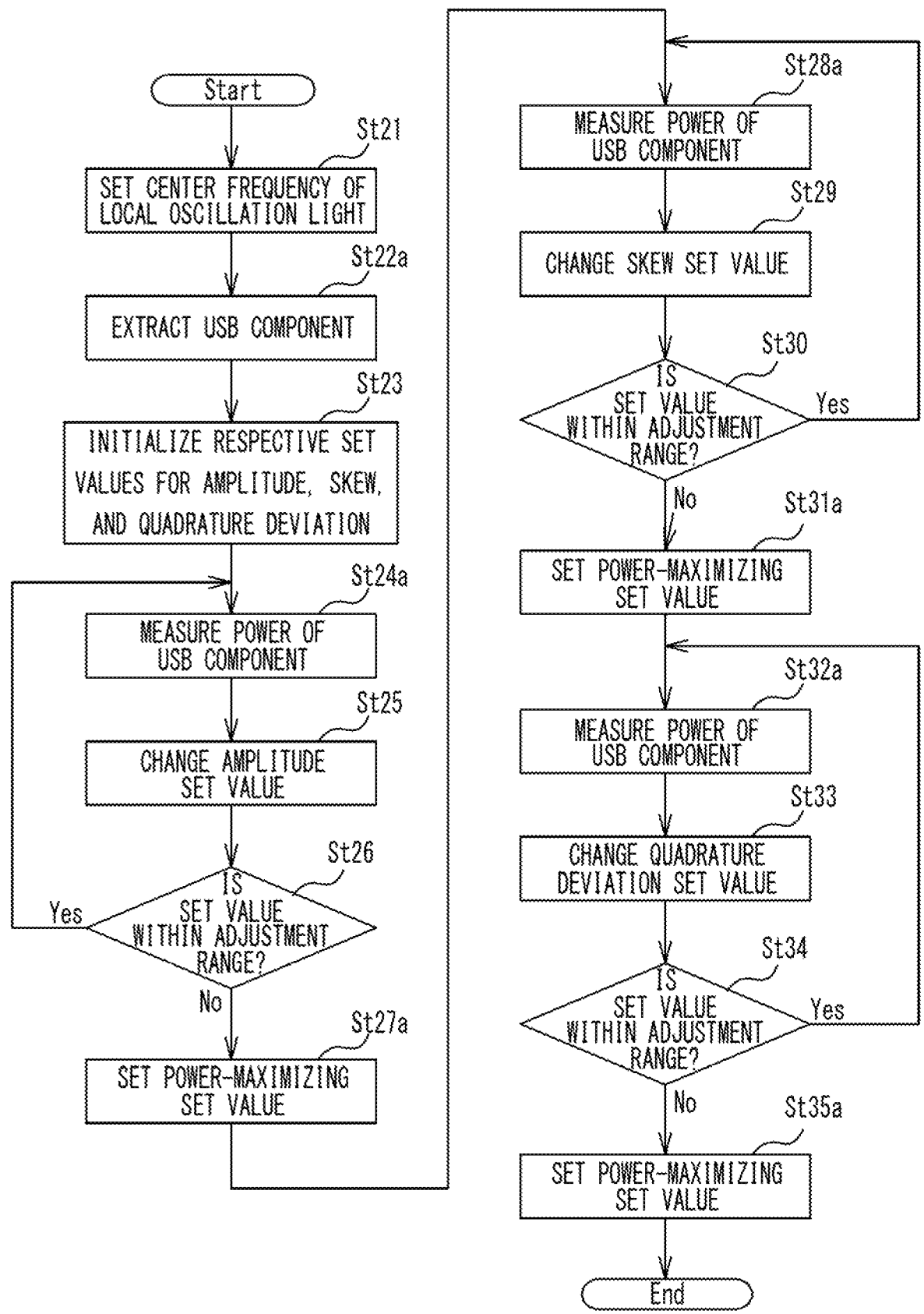
FIG. 12 is a flowchart showing another example of an IQ imbalance compensation process in the reception device.

FIG. 12 is a flowchart showing another example of the IQ imbalance compensation process in the reception device 2. In FIG. 12, the same procedures as those shown in FIG. 11 are denoted by the same reference signs as those used in FIG. 11, and explanation thereof will not be repeated.

The BPFs 41*a* and 41*b* extract the signal component in the upper sideband (USB component) from the signals Sx and Sy obtained from the test signal Sr (step St22*a*). As a result, the signal component in the signal band of the test signal Sr is extracted. In a case where the SSB signal generated in step St21 has its signal band in the lower sideband, the BPFs 41*a* and 41*b* extract the signal component in the lower sideband (LSB component) from the test signal Sr.

The power measuring units 42*a* and 42*b* measure the power of the signal component in the upper sideband (USB component) (steps St24*a*, St28*a*, and St32*a*). The parameter adjusting unit 43 sets the respective set values so that the measured power is maximized (steps St27*a*, St31*a*, and St35*a*).

Thus, the imbalance compensation device 4 can minimize the power difference, the skew, and the quadrature deviation between the in-phase component and the quadrature-phase component, by minimizing the crosstalk component.

An IQ imbalance in the transmission device 1 can also be compensated for by an imbalance compensation device provided in the reception device 2.

Figure 13:
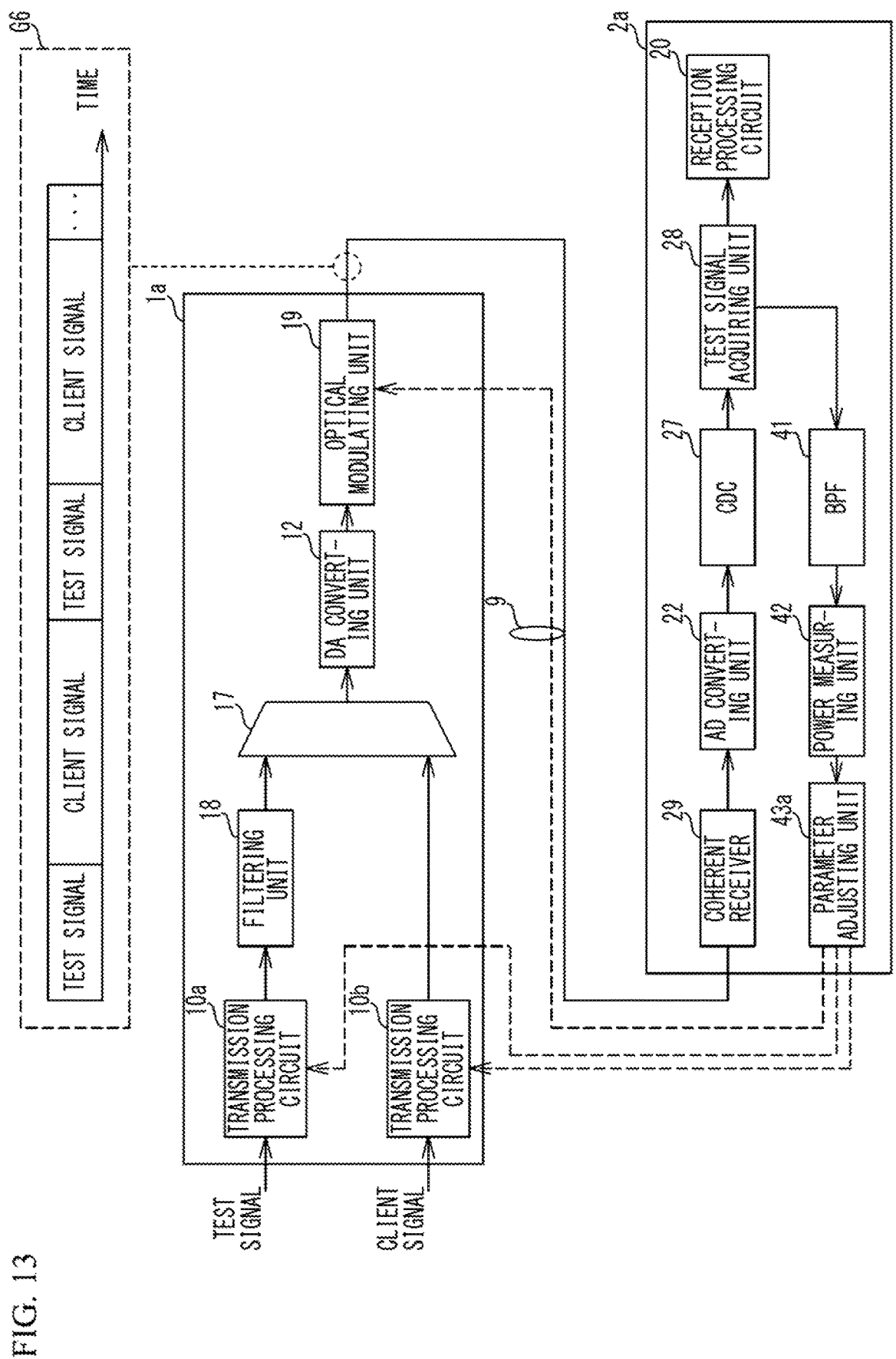
FIG. 13 is a configuration diagram showing an example of a transmission system that compensates for an IQ imbalance in a transmission device.

FIG. 13 is a configuration diagram showing an example of a transmission system that compensates for the IQ imbalance in a transmission device 1*a*. The transmission system includes the transmission device 1*a* and a reception device 2*a* that are connected to each other by a transmission path 9 formed with an optical fiber. In FIG. 13, the same components as those shown in FIGS. 6 and 9 are denoted by the same reference signs as those used in FIGS. 6 and 9, and explanation thereof will not be repeated.

The transmission device 1*a* includes transmission processing circuits 10*a* and 10*b*, a filtering unit 18, a signal multiplexing unit 17, a DA converting unit 12, and an optical modulating unit 19. The reception device 2*a* includes a coherent receiver 29, an AD converting unit 22, a wavelength dispersion compensating circuit (a chromatic dispersion compensator (CDC)) 27, a test signal acquiring unit 28, a reception processing circuit 20, a BPF 41, a power measuring unit 42, and a parameter adjusting unit 43*a*.

The transmission device 1*a* selects a test signal or a client signal, and transmits the selected signal to the transmission path 9. The transmission processing circuits 10*a* and 10*b* each have the same configuration as the above described transmission processing circuit 10. The transmission processing circuit 10*a* performs a test signal transmission process, and the transmission processing circuit 10*b* performs a client signal transmission process.

The test signal output from the transmission processing circuit 10*a* is input to the filtering unit 18. The filtering unit 18 includes the above described BPFs 18*a* through 18*d*. The test signal is converted into an SSB signal for each kind of polarization by the filtering unit 18, and is input to the signal multiplexing unit 17. It should be noted that the test signal should be converted into a signal having a difference between the mean power value of the signal component in the upper sideband and the mean power value of the signal component in the lower sideband.

The client signal output from the transmission processing circuit 10*b* is input to the signal multiplexing unit 17. It should be noted that the client signal is a double-sideband (DSB) signal.

The signal multiplexing unit 17 performs time-multiplexing on test signals and client signals, and outputs the resultant signals to the DA converting unit 12. The test signals and the client signals are alternately output on the time axis, for example, as indicated by reference sign G6. The test signals contain data in a predetermined pattern, for example, and are output in a training period during which the transmission characteristics are adjusted. It should be noted that the test signals are an example of a signal containing an in-phase component and a quadrature-phase component.

The DA converting unit 12 includes the above described DACs 12*a* through 12*d*. A test signal or a client signal converted into a digital signal by the DA converting unit 12 is modulated by the optical modulating unit 19, and is transmitted to the transmission path 9.

The reception device 2*a* receives a test signal or a client signal from the transmission device 1*a* via the transmission path 9. The test signal or the client signal is input to the coherent receiver 29. The test signal or the client signal output from the coherent receiver 29 is input to the AD converting unit 22. The AD converting unit 22 includes the above described ADCs 22*a* through 22*d*. The test signal or the client signal converted into a digital signal by the ADCs 22*a* through 22*d* is input to the CDC 27.

The CDC 27 compensates for wavelength dispersion caused in a test signal or a client signal in the transmission path 9. The test signal or the client signal subjected to the wavelength dispersion compensation is input to the test signal acquiring unit 28. It should be noted that the CDC 27 is formed with a circuit such as an FPGA.

The test signal acquiring unit 28 identifies a test signal from the predetermined pattern, for example, and outputs the test signal to the BPF 41. The test signal acquiring unit 28 also outputs a client signal to the reception processing circuit 20. It should be noted that the test signal acquiring unit 28 is formed with a circuit such as an FPGA.

The BPF 41 is an example of the extracting unit, and extracts the signal component in the upper sideband or the signal component in the lower sideband from the test signal input from the test signal acquiring unit 28. In a case where the test signal has its signal band in the upper sideband, the BPF 41 extracts the signal component in the lower sideband. In a case where the test signal has its signal band in the lower sideband, the BPF 41 extracts the signal component in the upper sideband. By doing so, the BPF 41 extracts the crosstalk component generated due to an IQ imbalance from the test signal. It should be noted that the BPF 41 is an electrical filter.

The power measuring unit 42 is an example of the measuring unit, and measures the power of the signal component extracted by the BPF 41. The power measuring unit 42 notifies the parameter adjusting unit 43*a* of the measured power.

The parameter adjusting unit 43*a* is an example of the adjusting unit, and, in accordance with the power measured by the power measuring unit 42, adjusts the parameters related to the IQ imbalance in the transmission device 1*a*. More specifically, in accordance with the power, the parameter adjusting unit 43*a* adjusts the respective set values of the amplitude adjusting units 102*a* through 102*d* and the deskewing units 103*a* through 103*d* of the transmission processing circuits 10*a* and 10*b*, and the phase shifters 16*a* and 16*b* of the optical modulating unit 19. The respective setting values are an example of the parameters related to the IQ imbalance, and are transmitted from the reception device 2*a* to the transmission device 1*a* via a local area network (LAN) or the like.

With this transmission system, it is possible to readily compensate for the IQ imbalance in the transmission device 1*a* in accordance with a test signal in a training period. In this example, each test signal is an SSB signal. However, a test signal is not limited to any particular signal, as long as it is a signal having a difference between the mean power value of the signal component in the upper sideband and the mean power value of the signal component in the lower sideband.

Also, a test signal may be periodically switched between a signal having its signal band in the upper sideband (this signal will be hereinafter referred to as the "USB signal") and a signal having its signal band in the lower sideband (this signal will be hereinafter referred to as the "LSB signal"). With this, the powers of test signals are averaged timewise between the upper sideband and the lower sideband, and thus, the above mentioned respective set values are adjusted with high precision.

Figure 14:
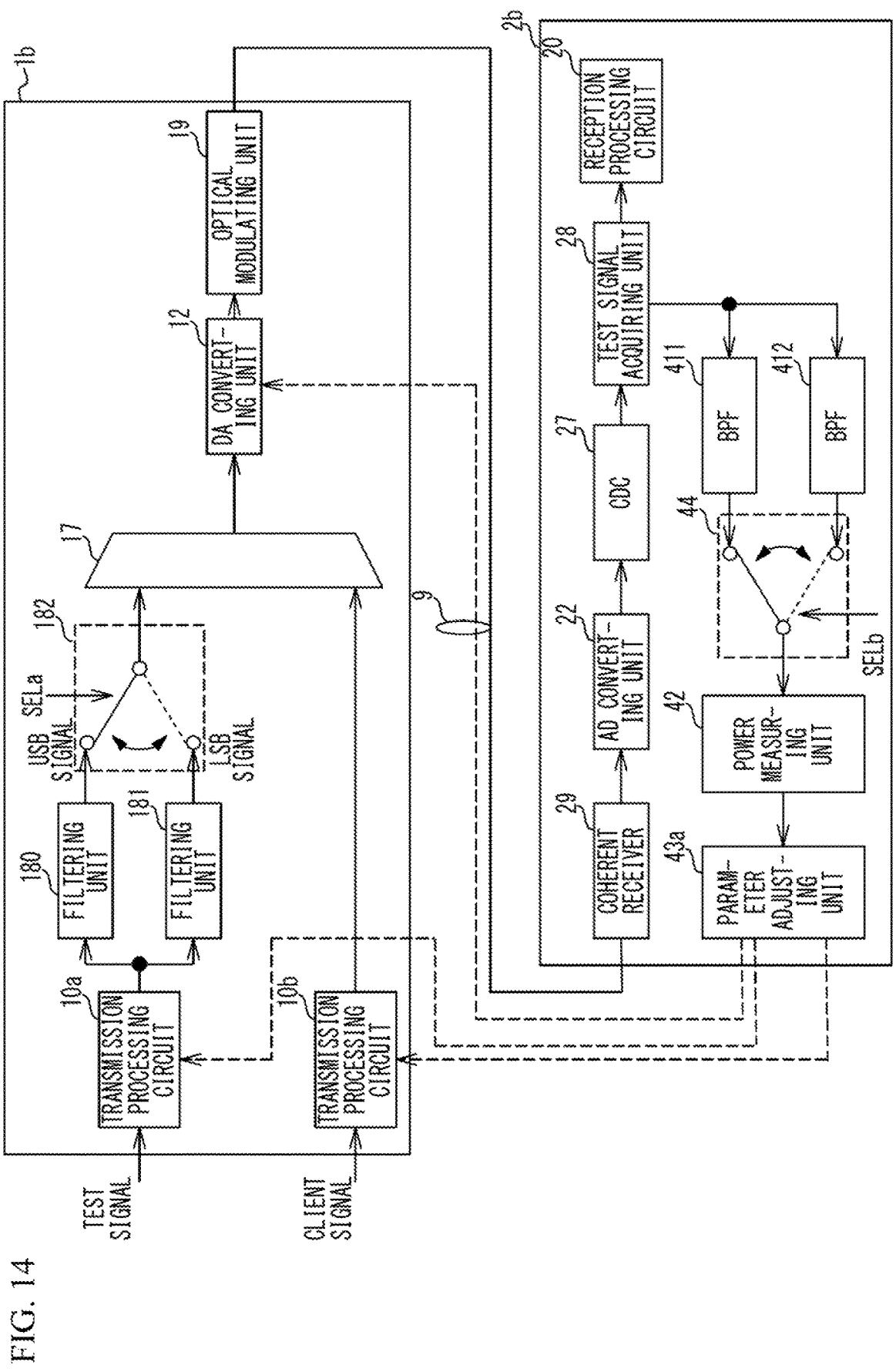
FIG. 14 is a configuration diagram showing another example of a transmission system that compensates for an IQ imbalance in a transmission device.

FIG. 14 is a configuration diagram showing another example of a transmission system that compensates for the IQ imbalance in a transmission device 1*b*. In FIG. 14, the same components as those shown in FIG. 13 are denoted by the same reference signs as those used in FIG. 13, and explanation thereof will not be repeated.

The transmission device 1*b* includes transmission processing circuits 10*a* and 10*b*, filtering units 180 and 181, a switching circuit 182, a signal multiplexing unit 17, a DA converting unit 12, and an optical modulating unit 19. A reception device 2*b* includes a coherent receiver 29, an AD converting unit 22, a CDC 27, a test signal acquiring unit 28, a reception processing circuit 20, BPFs 411 and 412, a switching circuit 44, a power measuring unit 42, and a parameter adjusting unit 43*a*.

A test signal output from the transmission processing circuit 10*a* is divided and input to the two filtering units 180 and 181. The filtering units 180 and 181 are equivalent to the above described BPFs 18*a* through 18*d*, and extract the signal component in the upper sideband or the lower sideband so that the test signal turns into an SSB signal. The filtering unit 180 converts the test signal into a USB signal, and the filtering unit 181 converts the test signal into an LSB signal. The respective test signals converted into the USB signal and the LSB signal are input to the switching circuit 182.

The switching circuit 182 selects the USB signal or the LSB signal in accordance with a select signal SELa, and outputs the selected signal to the signal multiplexing unit 17. The select signal SELa is controlled by a control circuit (not shown) so that USB signals and LSB signals are alternately output at regular intervals. Accordingly, test signals that are USB signals, and test signals that are LSB signals are alternately transmitted to the reception device 2*b* at regular intervals.

In the reception device 2*b*, a test signal output from the test signal acquiring unit 28 is divided and input to the two BPFs 411 and 412. The BPF 411 extracts the signal component in the lower sideband from the test signal, and the BPF 412 extracts the signal component in the upper sideband from the test signal. Therefore, when the test signal is a USB signal, the crosstalk component of the test signal is input from the BPF 411 to the switching circuit 44. When the test signal is an LSB signal, the crosstalk component of the test signal is input from the BPF 412 to the switching circuit 44.

In accordance with a select signal SELb, the switching circuit 182 selects the signal from the BPF 411 or the signal from the BPF 412, and outputs the selected signal to the power measuring unit 42. The select signal SELb is synchronized with the select signal SELa of the transmission device 1*b*, and is controlled by a control circuit (not shown) so that signals from the BPF 411 and signals from the BPF 412 are alternately output at regular intervals. Thus, the crosstalk components of test signals that are USB signals, and the crosstalk components of test signals that are LSB signals are alternately output to the power measuring unit 42 at regular intervals.

In this example, the powers of test signals are averaged timewise between the upper sideband and the lower sideband. Thus, the above mentioned respective set values are adjusted with high precision in the transmission device 1*b*. In this example, each test signal is an SSB signal. However, each test signal is not limited to any particular signal, as long as the signal has a difference between the mean power value of the signal component in the upper sideband and the mean power value of the signal component in the lower sideband.

Alternatively, a test signal may be an SSB signal only during the adjustment period for the above mentioned set values, because the test signal is to be used for purposes other than the adjustment of the set values related to the IQ imbalance, as will be described below.

Figure 15:
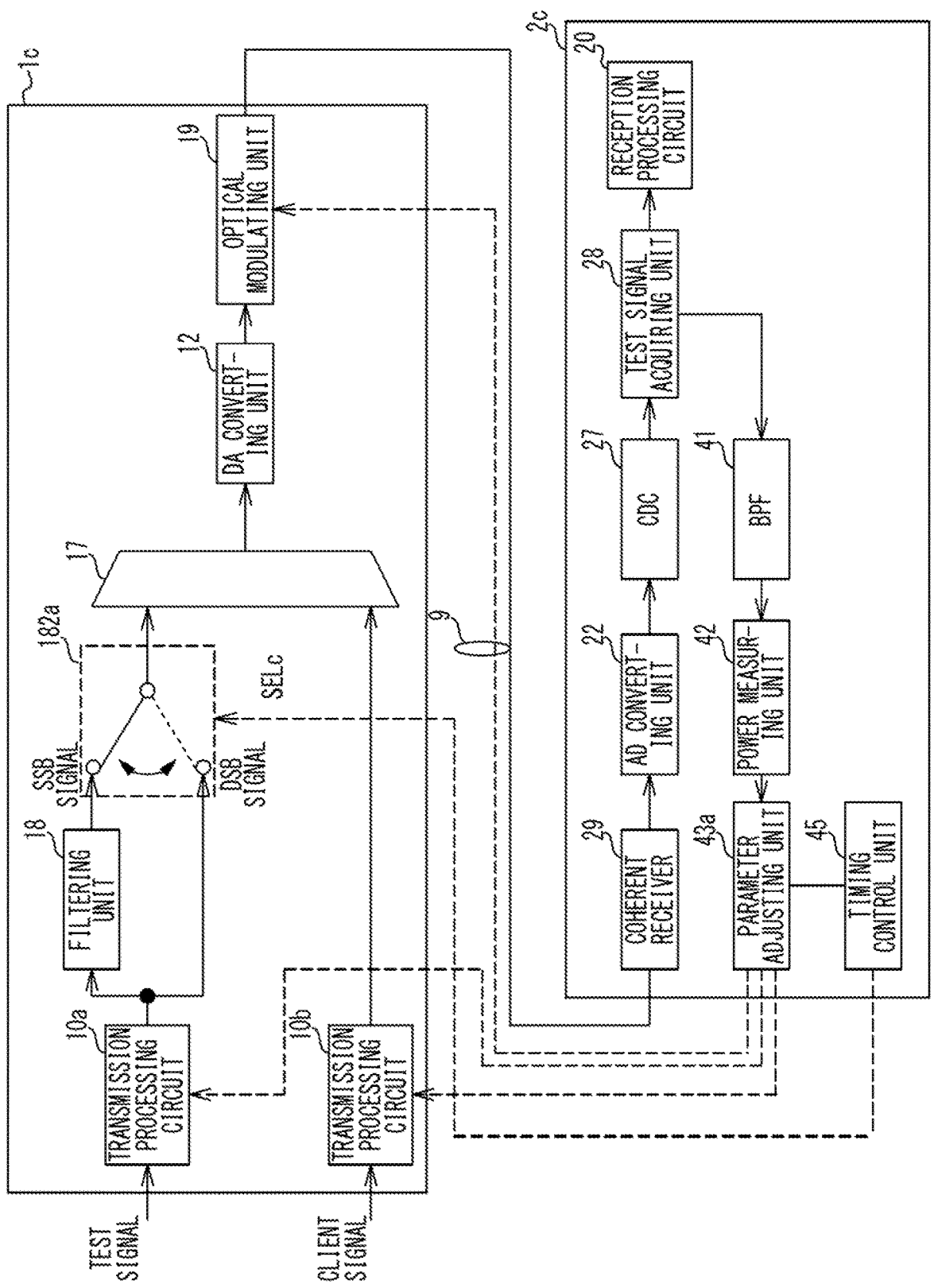
FIG. 15 is a configuration diagram showing another example of a transmission system that compensates for an IQ imbalance in a transmission device.

FIG. 15 is a configuration diagram showing another example of a transmission system that compensates for the IQ imbalance in a transmission device 1*c*. In FIG. 15, the same components as those shown in FIG. 13 are denoted by the same reference signs as those used in FIG. 13, and explanation thereof will not be repeated.

The transmission device 1*c* includes transmission processing circuits 10*a* and 10*b*, a switching circuit 182*a*, a signal multiplexing unit 17, a DA converting unit 12, and an optical modulating unit 19. A reception device 2*c* includes a coherent receiver 29, an AD converting unit 22, a CDC 27, a test signal acquiring unit 28, a reception processing circuit 20, a BPF 41, a power measuring unit 42, a parameter adjusting unit 43*a*, and a timing control unit 45.

A test signal output from the transmission processing circuit 10*a* is divided and input to a filtering unit 18 and the switching circuit 182*a*. The filtering unit 18 includes the above described BPFs 18*a* through 18*d*. The test signal is converted into an SSB signal for each kind of polarization by the filtering unit 18, for example, and is then input to the signal multiplexing unit 17. Here, the test signal should be converted into a signal having a difference between the mean power value of the signal component in the upper sideband and the mean power value of the signal component in the lower sideband.

The test signal as an SSB signal is input from the filtering unit 18 to the switching circuit 182*a*, and the test signal as a double sideband (DSB) signal is input from the transmission processing circuit 10*a* to the switching circuit 182*a*. In accordance with a select signal SELc, the switching circuit 182*a* selects the SSB signal or the DSB signal, and outputs the selected signal to the signal multiplexing unit 17. The select signal SELc is controlled by the timing control unit 45 of the reception device 2*c* so that a USB signal is output at a desired time.

During a training period, the transmission device 1*c* normally transmits test signals that are DSB signals. However, in a case where an IQ imbalance compensation process is to be performed, the transmission device 1*c* transmits test signals that are SSB signals.

In the reception device 2*c*, the timing control unit 45 notifies the switching circuit 182*a* in the transmission device 1*c* and the parameter adjusting unit 43*a* of the time to perform a compensation process on the IQ imbalance in the transmission device 1*c*. Accordingly, the parameter adjusting unit 43 can adjust the above mentioned respective set values in accordance with the time at which an SSB signal is output from the switching circuit 182*a*. It should be noted that the timing control unit 45 is formed with a circuit such as an FPGA.

Figure 16:
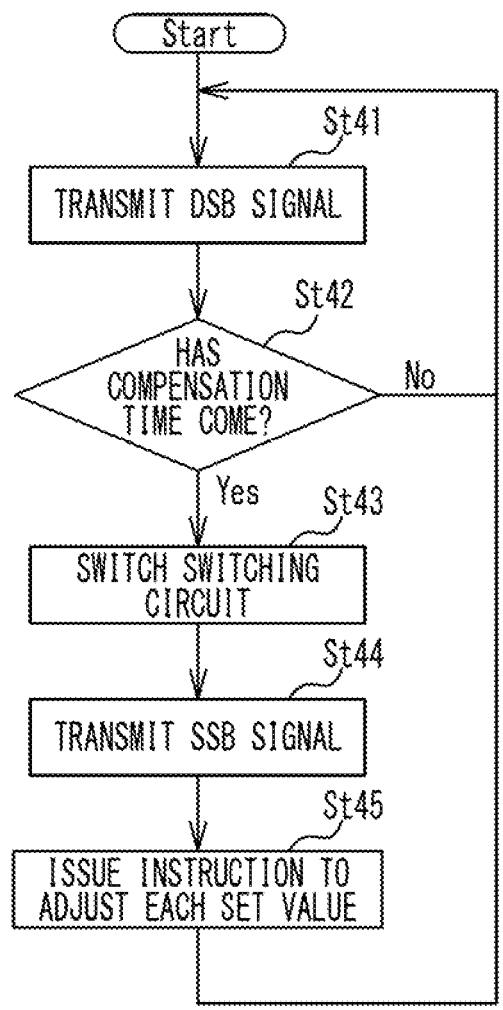
FIG. 16 is a flowchart showing an example of a control operation of a transmission system.

FIG. 16 is a flowchart showing an example of a control operation in the transmission system of this example. The transmission device 1*c* transmits a test signal that is a DSB signal (step St41). The timing control unit 45 of the reception device 2*c* then determines whether the time for IQ imbalance compensation has come, in accordance with a timer or the like (step St42). If the time for compensation has not come yet (No in step St42), the procedures in steps St41 and St42 are again carried out.

If the time for compensation has come (Yes in step St42), the timing control unit 45 switches the switching circuit 182*a* to the select signal SELc (step St43). The transmission device 1*c* then transmits a test signal that is an SSB signal (step St44). The timing control unit 45 then instructs the parameter adjusting unit 43 to adjust the above mentioned respective set values (step St45).

The transmission system operates in this manner. According to this example, IQ imbalance compensation can be performed at a desired time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An imbalance compensation device that compensates for an imbalance between an in-phase component and a quadrature-phase component of a signal, the imbalance compensation device comprising:
    a filter that extracts a first signal component in an upper sideband or a second signal component in a lower sideband from the signal;
    a photodiode that measures power of the first signal component or the second signal component extracted by the filter; and
    an adjusting circuit that adjusts a parameter related to the imbalance to reduce the power measured by the photodiode when the filter extracts the first signal component or the second signal component, whichever has smaller power, or to increase the power measured by the photodiode when the filter extracts the first signal component or the second signal component, whichever has larger power.

2. The imbalance compensation device of claim 1, wherein the signal is a single sideband signal.

3. A transmission device that transmits a signal containing an in-phase component and a quadrature-phase component, the transmission device comprising:
    a first filter that converts the signal to cause a difference between power of a first signal component in an upper sideband of the signal and power of a second signal component in a lower sideband of the signal;
    a second filter that extracts the first signal component or the second signal component from the signal converted by the first filter;
    a photodiode that measures the power of the first signal component or the second signal component extracted by the first filter; and
    an adjusting circuit that adjusts a parameter related to an imbalance between the in-phase component and the quadrature-phase component to reduce the power measured by the photodiode when the second filter extracts the first signal component or the second signal component, whichever has smaller power, or to increase the power measured by the photodiode when the second filter extracts the first signal component or the second signal component, whichever has larger power.

4. The transmission device of claim 3, wherein the signal is a single sideband signal.

5. An imbalance compensation method of compensating for an imbalance between an in-phase component and a quadrature-phase component of a signal, the imbalance compensation method comprising:
    extracting a first signal component in an upper sideband or a second signal component in a lower sideband from the signal;
    measuring power of an extracted first signal component in the upper sideband or an extracted second signal component in the lower sideband; and
    adjusting a parameter related to the imbalance to reduce measured power when the first signal component or the second signal component, whichever has smaller power, is extracted, or to increase the measured power when the first signal component or the second signal component, whichever has larger power, is extracted.

6. The imbalance compensation method of claim 5, wherein the signal is a single sideband signal.

* * * * *